US011814494B2

(12) United States Patent
Jamali et al.

(10) Patent No.: US 11,814,494 B2
(45) Date of Patent: Nov. 14, 2023

(54) THERMOPLASTIC POLYESTER PARTICLES AND METHODS OF PRODUCTION AND USES THEREOF

(71) Applicant: Xerox Corporation, Norwalk, CT (US)

(72) Inventors: Hojjat Seyed Jamali, Mississauga (CA); Valerie M. Farrugia, Oakville (CA)

(73) Assignee: Xerox Corporation, Norwalk, CT (US)

( * ) Notice: Subject to any disclaimer, the term of this patent is extended or adjusted under 35 U.S.C. 154(b) by 707 days.

(21) Appl. No.: 16/916,253

(22) Filed: Jun. 30, 2020

(65) Prior Publication Data

US 2021/0070954 A1    Mar. 11, 2021

Related U.S. Application Data

(60) Provisional application No. 62/897,534, filed on Sep. 9, 2019.

(51) Int. Cl.
    *C08J 7/06* (2006.01)
    *C08G 63/91* (2006.01)
    (Continued)

(52) U.S. Cl.
    CPC . *C08J 7/06* (2013.01); *B01J 2/08* (2013.01); *B29B 9/00* (2013.01); *C08G 63/91* (2013.01);
    (Continued)

(58) Field of Classification Search
    CPC ........ B29B 9/00; B01J 2/06; B01J 2/08; C08J 3/12; C08J 3/124; C08J 3/16;
    (Continued)

(56) References Cited

U.S. PATENT DOCUMENTS

| 4,863,646 A | 9/1989 | Watanabe et al. |
| 5,859,075 A | 1/1999 | Shukla et al. |

(Continued)

FOREIGN PATENT DOCUMENTS

| CN | 104 194 326 A | 12/2014 |
| DE | 10 2017 102137 A1 | 8/2015 |

(Continued)

OTHER PUBLICATIONS

EP search report for related matter EP20194471.7 dated Feb. 15, 2021.

(Continued)

*Primary Examiner* — Kregg T Brooks
(74) *Attorney, Agent, or Firm* — Vorys, Sater, Seymour, and Pease LLP

(57) ABSTRACT

A method of producing thermoplastic particles may comprise: mixing a melt emulsion comprising (a) a continuous phase that comprises a carrier fluid having a polarity Hansen solubility parameter (dP) of about 7 $MPa^{0.5}$ or less, (b) a dispersed phase that comprises a dispersing fluid having a dP of about 8 $MPa^{0.5}$ or more, and (c) an inner phase that comprises a thermoplastic polyester at a temperature greater than a melting point or softening temperature of the thermoplastic polyester and at a shear rate sufficiently high to disperse the thermoplastic polyester in the dispersed phase; and cooling the melt emulsion to below the melting point or softening temperature of the thermoplastic polyester to form solidified particles comprising the thermoplastic polyester.

15 Claims, 31 Drawing Sheets

(51) Int. Cl.
*C08J 3/12* (2006.01)
*C08L 67/02* (2006.01)
*B01J 2/08* (2006.01)
*B29B 9/00* (2006.01)
*C08J 3/16* (2006.01)

(52) U.S. Cl.
CPC ............... *C08J 3/124* (2013.01); *C08J 3/16* (2013.01); *C08L 67/02* (2013.01); *C08J 2367/00* (2013.01)

(58) Field of Classification Search
CPC ...... C08J 2367/00–08; C08L 67/00–08; C98G 63/00–918; C08G 63/00–918
See application file for complete search history.

(56) References Cited

U.S. PATENT DOCUMENTS

| | | | |
|---|---|---|---|
| 5,990,290 | A | 11/1999 | Phillips et al. |
| 7,740,938 | B2 | 6/2010 | Helft et al. |
| 8,822,555 | B2 | 9/2014 | Kaiso et al. |
| 10,655,025 | B2 | 5/2020 | Farrugia et al. |
| 2011/0229545 | A1 | 9/2011 | Shum et al. |
| 2015/0152214 | A1 | 6/2015 | Uenlue |
| 2017/0129177 | A1 | 5/2017 | Hättig et al. |

FOREIGN PATENT DOCUMENTS

| | | |
|---|---|---|
| EP | 0 866 088 A | 9/1998 |
| EP | 2 098 574 A1 | 9/2009 |
| JP | 2002080629 A | 3/2002 |
| WO | 1999067224 A1 | 12/1999 |
| WO | 2015/109143 A | 7/2015 |
| WO | 2019073030 A1 | 4/2019 |

OTHER PUBLICATIONS

Wegner, A.; Oehler, M.; Ünlü, T. Development of a new polybutylene terephthalate material for laser sintering process. Procedia Cirp 2018, 74, 254-258.

Schmidt, J.; Sachs, M.; Blümel, C.;Winzer, B.; Toni, F.; Wirth, K .-E.; Peukert,W. A Novel Process Route for the Production of Spherical SLS Polymer Powders. Procedia Eng. 2015, 102, 550-556.

H. Patil, et al. Hot-melt extrusion: from theory to application in pharmaceutical applicaitons, AAPS PharmSciTech, vol. 17, No. 1, pp. 20-42, Feb. 2016.

J. Sundararaj, et al. Drop breakup and coalescence in polymer blends: the effects of concentration and compatibilization, Macromolecules 1995, 28, 2647-2657.

R G Kleijnen, et al., Production and Processing of a Spherical Polybutylene Terephthalate Powder for Laser Sintering, Appl. Sci. 2019, 9(7), 1308.

I. Pillin, et al. Crystallization kinetics of poly(butylene terephthalate) (PBT): Infuence of additives and free carboxylic acid chain ends. Polym. Eng. Sci. 2001, 41, 178-191.

S Fanselow, et al. AIP Conference Proceedings 1713, 140007 (2016)—Production of micron-sized polymer particle for additive manufacturing by melt emulsification.

M Schmid, et al., AIP Conference Proceedings 1664, 160009 (2015)—Polymer powders for selective laser sintering (SLS).

M Schmid, et al., Additive Manufacturing: Polymers Applicable for Laser Sintering (LS), Procedia Engineering 149 (2016) 457-464.

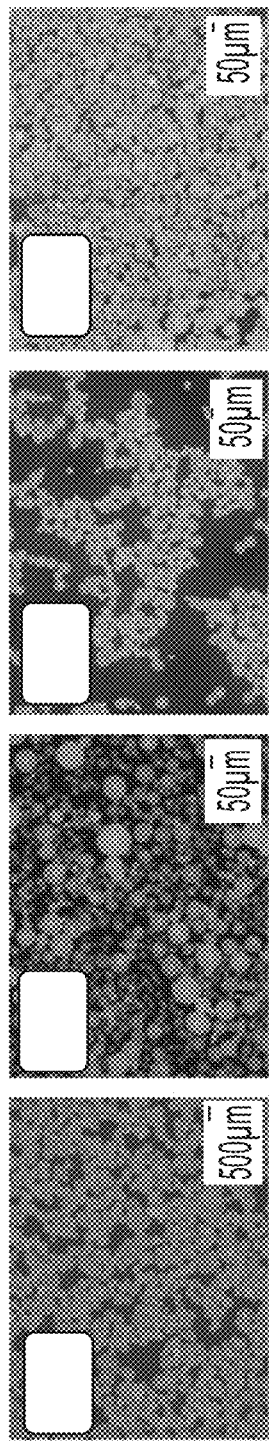
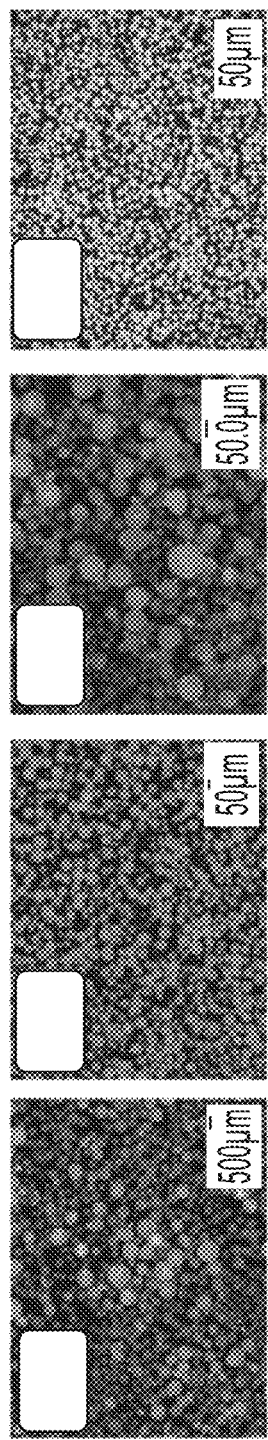

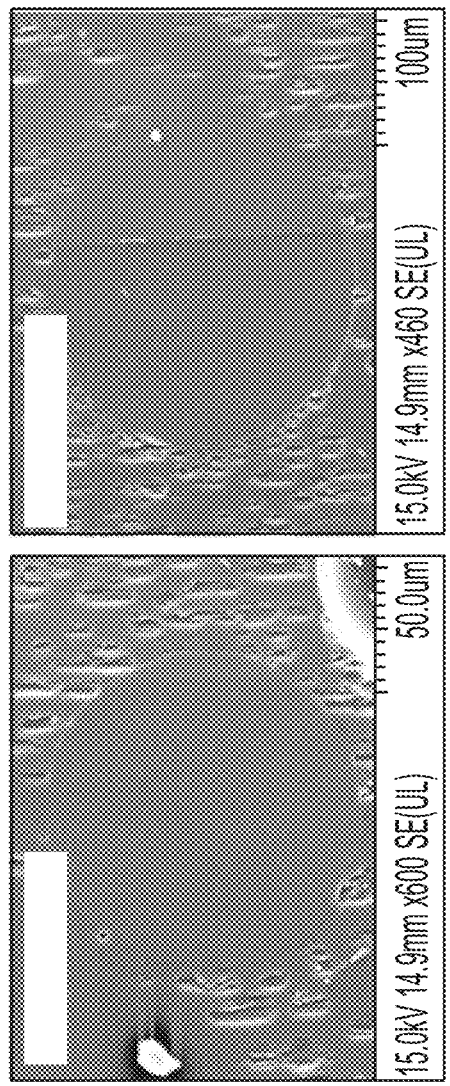

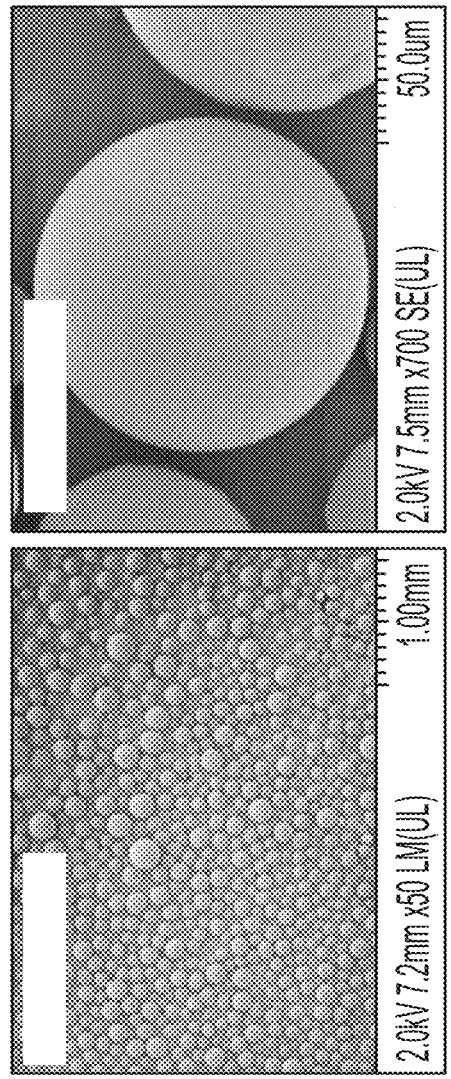

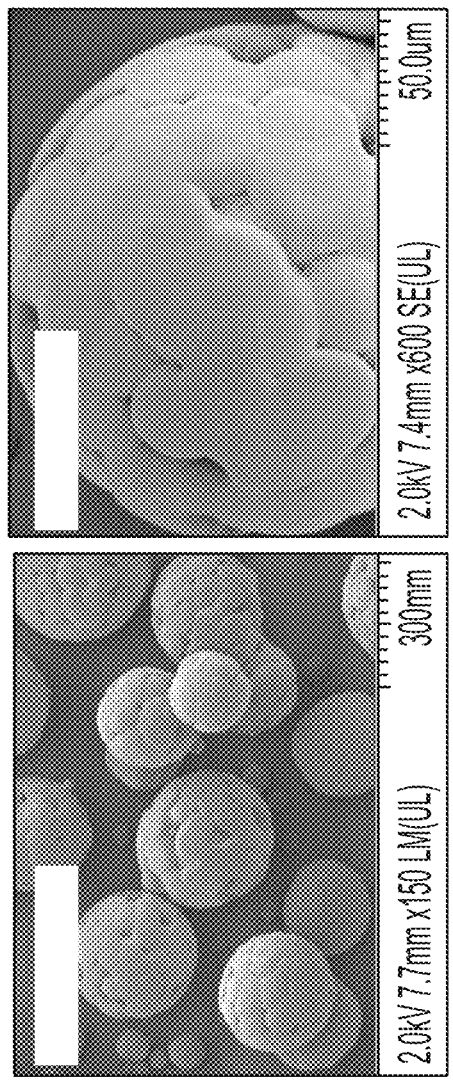

THERMOPLASTIC POLYESTER PARTICLES AND METHODS OF PRODUCTION AND USES THEREOF

CROSS-REFERENCE TO RELATED APPLICATIONS

The present application claims the benefit of priority under 35 U.S.C. § 119 from U.S. Provisional Patent Application 62/897,534, filed on Sep. 9, 2019 and incorporated herein by reference in its entirety.

TECHNICAL FIELD

The present disclosure relates to thermoplastic polyester particles and methods of making such particles. Such particles, especially the highly spherical thermoplastic polyester particles, may be useful, among other things, as starting material for additive manufacturing.

BACKGROUND

Three-dimensional (3-D) printing, also known as additive manufacturing, is a rapidly growing technology area. Although 3-D printing has traditionally been used for rapid prototyping activities, this technique is being increasingly employed for producing commercial and industrial objects, which may have entirely different structural and mechanical tolerances than do rapid prototypes.

3-D printing operates by depositing either (a) small droplets or streams of a melted or solidifiable material or (b) powder particulates in precise deposition locations for subsequent consolidation into a larger object, which may have any number of complex shapes. Such deposition and consolidation processes typically occur under the control of a computer to afford layer-by-layer buildup of the larger object. In a particular example, consolidation of powder particulates may take place in a 3-D printing system using a laser to promote selective laser sintering (SLS). Incomplete interlayer fusion may result in structural weak points, which may be problematic for printing objects having exacting structural and mechanical tolerances.

Powder particulates usable in 3-D printing include thermoplastic polymers, including thermoplastic elastomers, metals and other solidifiable substances. Although a wide array of thermoplastic polymers are known, there are relatively few having properties suitable for use in 3-D printing, particularly when using powder bed fusion (PBF). Additive manufacturing methods using powdered materials include PBF, selective laser sintering (SLS), selective heat sintering (SHM), selective laser melting (SLM), electron beam melting (EBM), binder jetting, and multi jet fusion (MJF). In the SLS printing method, the particles are fused together by the energy from a high-powered laser. Typical thermoplastic polymers suitable for use in 3-D printing include those having sharp melting points and recrystallization points about 20° C. to 50° C. below the melting point. This difference may allow for a more effective coalescence between adjacent polymer layers to take place, thereby promoting improved structural and mechanical integrity.

For good printing performance to be realized using powder particulates, particularly polymer powder particulates, the powder particulates need to maintain good flow properties in the solid state. Flow properties may be evaluated, for example, by measuring the fraction of powder particulates from a sample that are able to pass through a standard sieve of a specified size and/or measuring of the angle of repose. High fractions of sievable powder particulates may be indicative of the particulates existing as non-agglomerated, substantially individual particulates, which may be characteristic of ready powder flow. Lower values of the angle of repose, in contrast, may be characteristic of ready powder flow. A relatively narrow particle size distribution and regularity of the particulate shape in a sample may also aid in promoting good powder flow performance.

Commercial powder particulates are oftentimes obtained by cryogenic grinding or precipitation processes, which may result in irregular particulate shapes and wide particle size distributions. Irregular particulate shapes may result in poor powder flow performance during 3-D printing processes. In addition, powder particulates having shape irregularity, especially those obtained from current commercial processes, may afford poor packing efficiency following deposition and consolidation, thereby resulting in extensive void formation in a printed object due to the powder particulates not packing closely together during deposition. Wide particle size distributions may be similarly problematic in this regard. Although poor powder flow performance may be addressed to some degree through dry blending with fillers and flow aids, these techniques may have limited effectiveness with softer polymer materials, such as elastomers, due to particulate aggregation.

SUMMARY OF THE INVENTION

The present disclosure relates to thermoplastic polyester particles and methods of making such particles. Such particles, especially the highly spherical thermoplastic polyester particles, may be useful, among other things, as starting material for additive manufacturing.

According to aspects illustrated herein, there is provided a method comprising: mixing a melt emulsion comprising (a) a continuous phase that comprises a carrier fluid having a polarity Hansen solubility parameter ($d_P$) of about 7 $MPa^{0.5}$ or less, (b) a dispersed phase that comprises a dispersing fluid having a $d_P$ of about 8 $MPa^{0.5}$ or more, and (c) an inner phase that comprises a thermoplastic polyester at a temperature greater than a melting point or softening temperature of the thermoplastic polyester and at a shear rate sufficiently high to disperse the thermoplastic polyester in the dispersed phase; and cooling the melt emulsion to below the melting point or softening temperature of the thermoplastic polyester to form solidified particles comprising the thermoplastic polyester.

According to aspects illustrated herein, there is provided a composition comprising: particles comprising a thermoplastic polyester, wherein the particles have a sintering window that is within 5° C. of a sintering window of the thermoplastic polyester.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 3A is an optical micrograph of the particles of Example 1.

FIG. 3B is an optical micrograph of the particles of Example 2.

FIG. 3C is an optical micrograph of the particles of Example 3.

FIG. 3D is an optical micrograph of the particles of Example 4.

FIG. 3E is an optical micrograph of the particles of Example 5.

FIG. 3F is an optical micrograph of the particles of Example 6.

FIG. 3G is an optical micrograph of the particles of Example 7.

FIG. 3H is an optical micrograph of the particles of Example 8.

FIGS. 9A-B are scanning electron micrographs and FIGS. 9C-F are cross-section scanning electron micrographs of the particles of Example 11.

FIG. 11A-B are scanning electron micrographs and FIGS. 11C-F are cross-section scanning electron micrographs of the particles of Example 12.

FIG. 14A-D includes scanning electron micrographs at various magnifications of the particles produced in Example 17.

DETAILED DESCRIPTION

The present disclosure relates to polymer particles comprising thermoplastic polyester and methods of making such particles. Such particles, especially the highly spherical polymer particles comprising thermoplastic polyester, may be useful, among other things, as starting material for additive manufacturing.

Figure 1:
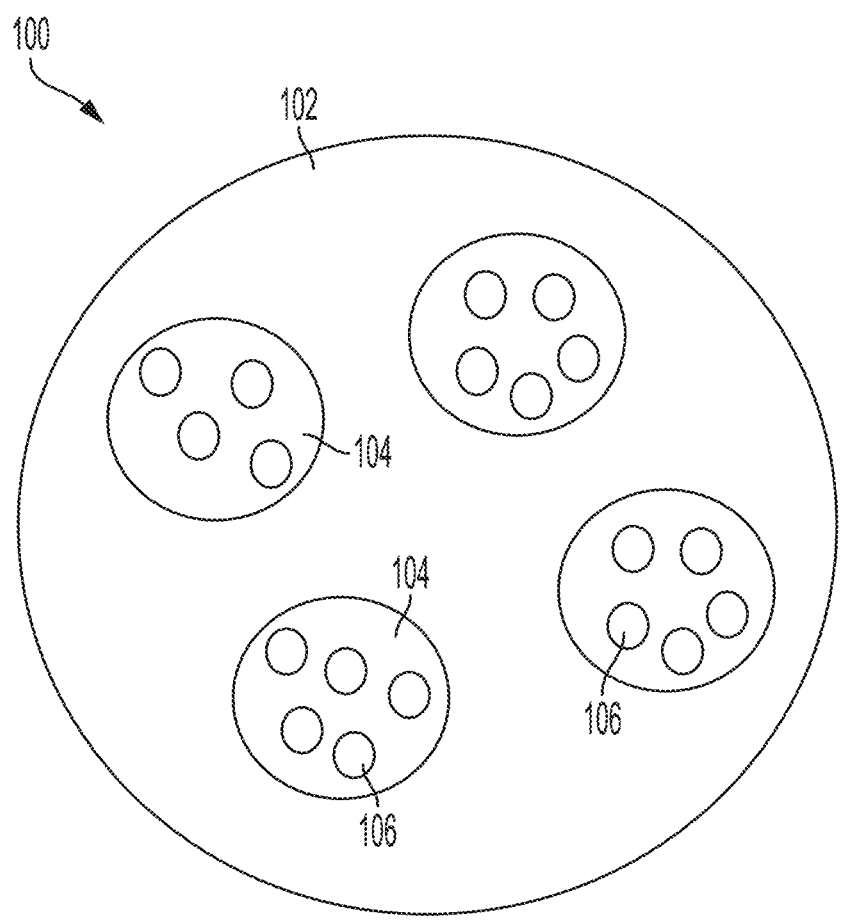
FIG. 1 is a flow chart of a nonlimiting example of a multi-phase melt emulsion.

More specifically, the polymer particles described herein are produced by melt emulsification methods where said melt emulsion has three or more phases. FIG. 1 illustrates a three-phase melt emulsion comprising (a) a continuous phase 102 that comprises a carrier fluid (e.g., polydimethyl siloxane), (b) a dispersed phase 104 that comprises a dispersing fluid, and (c) an inner phase 106 that comprises the thermoplastic polyester. The carrier fluid, dispersing fluid, and thermoplastic polyester are each immiscible with each other. While FIG. 1 illustrates several inner phase droplets within in the dispersed phase, a dispersed phase droplet may have a single inner phase droplet therein.

Without being limited by theory, it is believed that hydrolysis and/or grafting of polyesters in the melt emulsification process can cause a reduction in the sintering window of the resultant particles. That is, temperature range under which sintering can be effectively performed reduces when the polyester is hydrolyzed and/or grafted. Therefore, the composition of the dispersed phase is preferably chosen to not contribute to hydrolysis and/or grafting of the thermoplastic polyester. For example, hydroxyl terminal polyethylene glycol, which has been used in other melt emulsification methods, can cleave polyester bonds via transesterification mechanism. Further, the hydroxyl terminal polyethylene glycol may be able to graft to the polyester or byproducts of polyester hydrolysis. Accordingly, alkyl-terminal polyethylene glycol are preferred in the dispersed phase because said polymers are inert toward transesterification and cleavage of the polyester chains. Additionally, the methods described herein can be tailored to further mitigate hydrolysis by one or more of: (a) performing the melt emulsification in an inert gas environment when not performed in an apparatus (e.g., an extruder) where an additional gas environment is not present and (b) using a carrier fluid that is less hygroscopic (if at all) minimize the hydrolysis due to the less water content.

In the methods described herein, a sufficient amount of shear is used to disperse the dispersing fluid in the carrier fluid and cause the polymer melt to form droplets in the dispersing fluid. As described further herein, to achieve an emulsion with three or more phases, the composition of said phases are chosen based on (a) solubility parameters and/or (b) viscosity at processing temperature.

Emulsion stabilizers (e.g., nanoparticles and/or surfactants, including one or more members of each type in some cases) may be used to affect the surface tension at the phase interface between the carrier fluid and the polymer melt. Once the melt emulsification process is complete, the dispersion is cooled, which solidifies the polymer into polymer particles. Without being limited by theory, during the melt emulsification process, the emulsion stabilizers primarily reside at the interface between the polymer melt and the carrier fluid. As a result, when the mixture is cooled, the emulsion stabilizers remain at said interface. Advantageously, the emulsion stabilizers at a surface of the resultant particles may assist with the flow properties of the resultant particles.

Definitions and Test Methods

As used herein, the term "immiscible" refers to a mixture of components that, when combined, form two or more phases that have less than 5 wt % solubility in each other at ambient pressure and at room temperature or the melting point of the component if it is solid at room temperature. For example, polyethylene oxide having 10,000 g/mol molecular weight is a solid at room temperature and has a melting point of 65° C. Therefore, said polyethylene oxide is immiscible with a material that is liquid at room temperature if said material and said polyethylene oxide have less than 5 wt % solubility in each other at 65° C.

As used herein, the term "thermoplastic polymer" refers to a plastic polymer material that softens/melts and hardens/solidifies reversibly on heating and cooling. Thermoplastic polymers encompass thermoplastic elastomers.

As used herein, the term "elastomer" refers to a copolymer comprising a crystalline "hard" section and an amorphous "soft" section. In the case of a polyurethane, the crystalline section may include a portion of the polyurethane comprising the urethane functionality and optional chain extender group, and the soft section may include the polyol, for instance.

As used herein, the term "polyurethane" refers to a polymeric reaction product between a diisocyanate, a polyol, and an optional chain extender.

As used herein, the term "oxide" refers to both metal oxides and non-metal oxides. For purposes of the present disclosure, silicon is considered to be a metal.

As used herein, the terms "associated," "association," and grammatical variations thereof between emulsion stabilizers and a surface refers to chemical bonding and/or physical adherence of the emulsion stabilizers to the surface. Without being limited by theory, it is believed that the associations described herein between polymers and emulsion stabilizers are primarily physical adherences via hydrogen bonding and/or other mechanisms. However, chemical bonding may be occurring to some degree.

As used herein, the term "embed" relative to nanoparticles and a surface of a polymer particle refers to the nanoparticle being at least partially extending into the surface such that polymer is in contact with the nanoparticle to a greater degree than would be if the nanoparticle were simply laid on the surface of the polymer particle.

Herein, D10, D50, D90, and diameter span are primarily used herein to describe particle sizes. As used herein, the term "D10" refers to a diameter with 10% of the sample (on a volume basis, unless otherwise specified) is comprised of particles having a diameter less than said diameter value. As used herein, the term "D50" refers to a diameter with 50% of the sample (on a volume basis, unless otherwise specified) is comprised of particles having a diameter less than said diameter value. As used herein, the term "D90" refers to a diameter with 90% of the sample (on a volume basis, unless otherwise specified) is comprised of particles having a diameter less than said diameter value.

As used herein, the terms "diameter span" and "span" and "span size" when referring to diameter provides an indication of the breadth of the particle size distribution and is calculated as (D90−D10)/D50 (again, each D-value is based on volume, unless otherwise specified).

Particle size can be determined by light scattering techniques using a Malvern MASTERSIZER™ 3000 or analysis of optical digital micrographs. Unless otherwise specified, light scattering techniques are used for analyzing particle size.

For light scattering techniques, the control samples were glass beads with a diameter within the range of 15 µm to 150 µm under the tradename Quality Audit Standards QAS4002™ obtained from Malvern Analytical Ltd. Samples were analyzed as dry powders, unless otherwise indicated. The particles analyzed were dispersed in air and analyzed using the AERO S dry powder dispersion module with the MASTERSIZER™ 3000. The particle sizes were derived using instruments software from a plot of volume density as a function of size.

Particle size measurement and diameter span can also be determined by optical digital microscopy. The optical images are obtained using a Keyence VHX-2000 digital microscope using version 2.3.5.1 software for particle size analysis (system version 1.93).

As used herein, when referring to sieving, pore/screen sizes are described per U.S.A. Standard Sieve (ASTM E11-17).

As used herein, the terms "circularity" and "sphericity" relative to the particles refer to how close the particle is to a perfect sphere. To determine circularity, optical microscopy images are taken of the particles. The perimeter (P) and area (A) of the particle in the plane of the microscopy image is calculated (e.g., using a SYSMEX FPIA 3000 particle shape and particle size analyzer, available from Malvern Instruments). The circularity of the particle is $C_{EA}/P$, where $C_{EA}$ is the circumference of a circle having the area equivalent to the area (A) of the actual particle.

As used herein, the term "sintering window" refers to the difference between the melting temperature (Tm) onset and the crystallization temperature (Tc) onset, or (Tm−Tc)onset. Tm, Tm(onset), Tc, and Tc(onset) are determined by differential scanning calorimetry per ASTM E794-06 (2018) with a 10° C./min ramp rate and a 10° C./min cool rate.

As used herein, the term "shear" refers to stirring or a similar process that induces mechanical agitation in a fluid.

As used herein, the term "aspect ratio" refers to length divided by width, wherein the length is greater than the width.

The melting point of a polymer, unless otherwise specified, is determined by ASTM E794-06 (2018) with 10° C./min ramping and cooling rates.

The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min.

Angle of repose is a measure of the flowability of a powder. Angle of repose measurements were determined using a Hosokawa Micron Powder Characteristics Tester PT-R using ASTM D6393-14 "Standard Test Method for Bulk Solids" characterized by Carr Indices.

Hausner ratio ($H_r$) is a measure of the flowability of a powder and is calculated by $H_r = \rho_{tap}/\rho_{bulk}$, where $\rho_{bulk}$ is the bulk density per ASTM D6393-14 and $\rho_{tap}$ is the tapped density per ASTM D6393-14.

As used herein, viscosity of carrier fluids are the kinematic viscosity at 25° C., unless otherwise specified, measured per ASTM D445-19. For commercially procured carrier fluids (e.g., PDMS oil), the kinematic viscosity data cited herein was provided by the manufacturer, whether measured according to the foregoing ASTM or another standard measurement technique.

As used herein, Hansen solubility parameters are determined per *Hansen Solubility Parameters: A User's Handbook*. Charles M. Hansen. CRC Press, Boca Raton, FL. 2007. $2^{nd}$ Ed. Further, the Hansen solubility parameters for a mixture can be calculated by the volume-weighted average of the Hansen solubility parameters for each component in the mixture. The total Hansen solubility parameter is the geometric mean of the three Hansen solubility components: $d_D$ (from dispersion interactions), $d_P$ (from polar attraction), and $d_H$ (from hydrogen bonding).

Polymer Particles and Methods of Making

Figure 2:
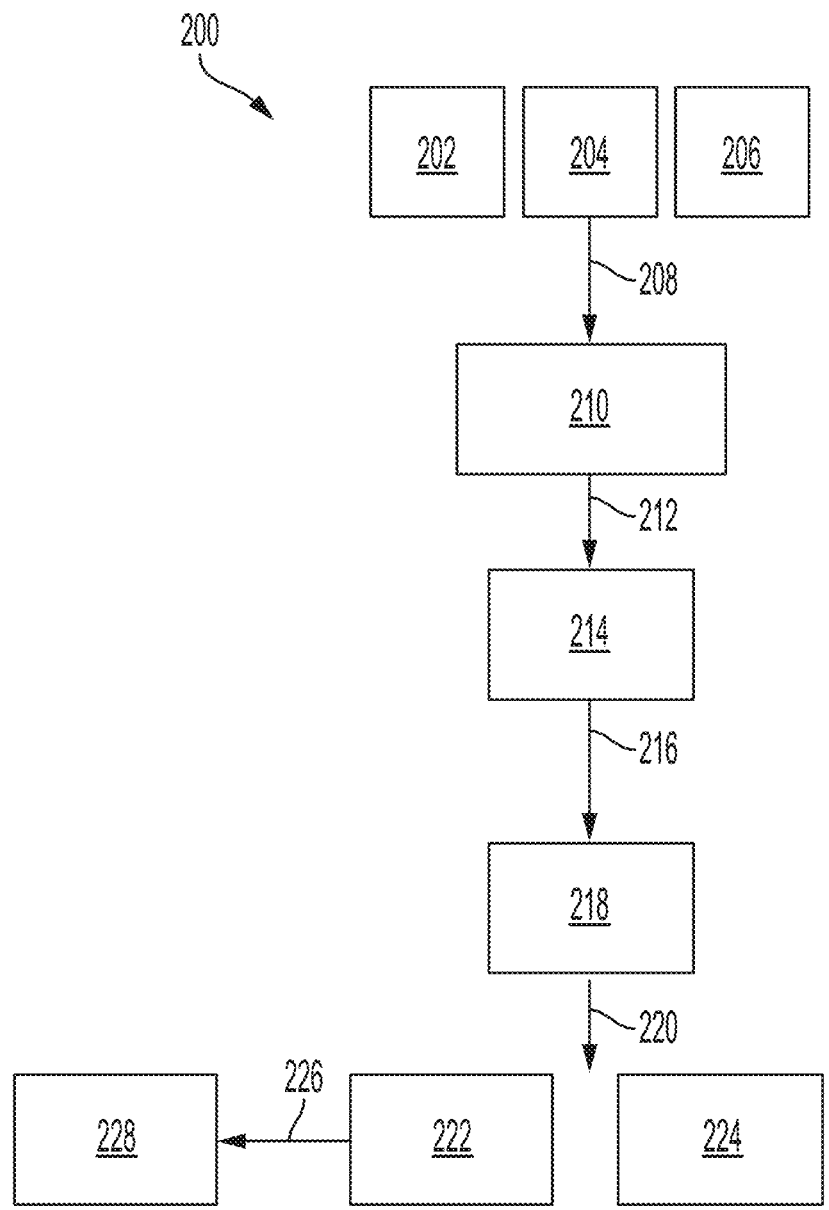
FIG. 2 is a flow chart of a nonlimiting example method 100 of the present disclosure.

FIG. 2 is a flow chart of a nonlimiting example method 200 of the present disclosure. A polymer 202, carrier fluid 204, dispersing fluid 206, and optionally an emulsion stabilizer (not illustrated) are combined 208 to produce a mixture 210. The polymer 202 comprises thermoplastic polyester and, optionally, one or more additional thermoplastic polymers. The components 202, 204, and 206 can be added in any order and include mixing and/or heating during the process of combining 208 the components 202, 204, and 206.

Examples of thermoplastic polyesters include, but are not limited to, polybutylene terephthalate (PBT), polyethylene terephthalate (PET), polyethylene naphthalate (PEN), polytrimethylene terephthalate (PTT), polyhexamethylene terephthalate, and the like, and any combination thereof.

The mixture 210 is then processed 212 by applying sufficiently high shear to the mixture 210 at a temperature greater than the melting point or softening temperature of the polymer 202 to form a melt emulsion 214 having three or more phases. More specifically, the melt emulsion may comprise (a) a continuous phase that comprises the carrier fluid 204 (e.g., polydimethylsiloxane), (b) a dispersed phase that comprises the dispersing fluid 206, and (c) an inner phase that comprises the polymer 202. To achieve separate continuous and dispersed phases with the inner phase dispersed in the dispersed phase, the carrier fluid 204 preferably has a polarity Hansen solubility parameter $(d_P)$ of about 7 $MPa^{0.5}$ or less (or 0 $MPa^{0.5}$ to 7 $MPa^{0.5}$, or 0 $MPa^{0.5}$ to 5 $MPa^{0.5}$, or about 3 $MPa^{0.5}$ to 7 $MPa^{0.5}$), and the dispersing fluid 206 preferably has a $d_P$ of about 8 $MPa^{0.5}$ or more (or 8 $MPa^{0.5}$ to 30 $MPa^{0.5}$, or 8 $MPa^{0.5}$ to 15 $MPa^{0.5}$, or 13 $MPa^{0.5}$ to 20 $MPa^{0.5}$, or about 15 $MPa^{0.5}$ to 30 $MPa^{0.5}$). Further, the difference between the $d_P$ of the dispersing fluid 206 and the $d_P$ of the carrier fluid 204 is preferably 3 $MPa^{0.5}$ or more (or 3 $MPa^{0.5}$ to 30 $MPa^{0.5}$, or 3 $MPa^{0.5}$ to 10 $MPa^{0.5}$, or about 5 $MPa^{0.5}$ to 15 $MPa^{0.5}$, or about 10 $MPa^{0.5}$ to 20 $MPa^{0.5}$, or about 15 $MPa^{0.5}$ to 30 $MPa^{0.5}$).

Because the temperature is above the melting point or softening temperature of the polymer 202, the polymer 202 becomes a polymer melt. By way of nonlimiting example, PBT has a softening temperature of about 170° C. and a melting temperature of about 223° C. Accordingly, the temperature of the mixing to form the melt emulsion 214 with PBT may be about 180° C. to about 320° C. (or about 180° C. to about 250° C., or about 200° C. to about 300° C., or about 225° C. to about 300° C.). The temperature may vary if additional thermoplastic polymers and/or additional thermoplastic polyesters are used in addition to the PBT. More generally, the temperature of the mixing to form the melt emulsion 214 may be about 150° C. to about 350° C. (or about 150° C. to about 250° C., or about 200° C. to about 300° C., or about 250° C. to about 350° C.). Again, temperatures outside these ranges may be applicable depending on the polymers included in the process. The mixture 210 is preferably substantially free of water (e.g., less than 1 wt % water) to mitigate hydrolysis of the thermoplastic polyester. Further, the mixture may be heated in an inert gas environment (e.g., using nitrogen or argon) to mitigate the introduction of additional water into the mixture 200.

Further, the shear rate should be sufficient enough to disperse the polymer melt in the dispersing fluid 206 as droplets. Without being limited by theory, it is believed that, all other factors being the same, increasing shear should decrease the size of the droplets of the polymer melt in the carrier fluid 204. However, at some point there may be diminishing returns on increasing shear and decreasing droplet size, or there may be disruptions to the droplet contents that decrease the quality of particles produced therefrom.

The melt emulsion 214 inside and/or outside the mixing vessel is then cooled 216 to solidify the polymer droplets into polymer particles (also referred to as solidified polymer particles). The cooled mixture 218 can then be treated 220 to isolate the polymer particles 222 from other components 224 (e.g., the carrier fluid 204, the dispersing fluid 206, excess emulsion stabilizer when used, and the like) and wash, or otherwise purify, the polymer particles 222. The polymer particles 222 comprise the polymer 202 and at least a portion of the emulsion stabilizer, when used, coating the outer surface of the polymer particles 222. Emulsion stabilizers, or a portion thereof, may be deposited as a uniform coating on the polymer particles 222. In some instances, which may be dependent upon non-limiting factors such as the temperature (including cooling rate), the type of polymer 202, and the types and sizes of emulsion stabilizers, the nanoparticles of emulsion stabilizers may become at least partially embedded within the outer surface of polymer particles 222 in the course of becoming associated therewith. Even without embedment taking place, at least the nanoparticles within emulsion stabilizers 206 may remain robustly associated with polymer particles 222 to facilitate their further use. In contrast, dry blending already formed polymer particulates (e.g., formed by cryogenic grinding or precipitation processes) with a flow aid like silica nanoparticles does not result in a robust, uniform coating of the flow aid upon the polymer particulates.

Advantageously, carrier fluids, dispersing fluids, and washing solvents of the systems and methods described herein (e.g., method 200) can be recycled and reused. One skilled in the art will recognize any necessary cleaning of used carrier fluid, dispersing fluid, and solvent necessary in the recycling process.

The polymer 202, the carrier fluid 204, and the dispersing fluid 206 should be chosen such that at the various processing temperatures (e.g., from room temperature to process temperature) the polymer 202, the carrier fluid 204, and the dispersing fluid 206 are immiscible with each other. An additional factor that may be considered is the differences in (e.g., a difference or a ratio of) viscosity at process temperature between the molten polymer 202, the carrier fluid 204, and the dispersing fluid 206. The differences in viscosity may affect droplet breakup and particle size distribution. Without being limited by theory, it is believed that when the viscosities of the molten polymer 202, the carrier fluid 204, and the dispersing fluid 206 are too similar, the circularity of the product as a whole may be reduced where the particles are more ovular and more elongated structures are observed.

Examples of thermoplastic polymers that may be used in combination with the thermoplastic polyester include, but are not limited to, polyamides, polyurethanes, polyethylenes, polypropylenes, polyacetals, polycarbonates, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and the like, and any combination thereof. Copolymers comprising one or more of the foregoing may also be used in the methods and systems of the present disclosure.

The thermoplastic polymers in the compositions and methods of the present disclosure may be elastomeric or non-elastomeric. Some of the foregoing examples of thermoplastic polymers may be elastomeric or non-elastomeric depending on the exact composition of the polymer. For example, polyethylene that is a copolymer of ethylene and propylene may be elastomeric or not depending on the amount of propylene in the polymer.

Thermoplastic elastomers generally fall within one of six classes: styrenic block copolymers, thermoplastic polyolefin elastomers, thermoplastic vulcanizates (also referred to as elastomeric alloys), thermoplastic polyurethanes, thermoplastic copolyesters, and thermoplastic polyamides (typically block copolymers comprising polyamide).

Examples of polyamides include, but are not limited to, polycaproamide (nylon 6, polyamide 6, or PA6), poly(hexamethylene succinamide) (nylon 4,6, polyamide 4,6, or PA4,6), polyhexamethylene adipamide (nylon 6,6, polyamide 6,6, or PA6,6), polypentamethylene adipamide (nylon 5,6, polyamide 5,6, or PA5,6), polyhexamethylene sebacamide (nylon 6,10, polyamide 6,10, or PA6,10), polyundecaamide (nylon 11, polyamide 11, or PA11), polydodecaamide (nylon 12, polyamide 12, or PA12), and polyhexamethylene terephthalamide (nylon 6T, polyamide 6T, or PA6T), nylon 10,10 (polyamide 10,10 or PA10,10), nylon 10,12 (polyamide 10,12 or PA10,12), nylon 10,14 (polyamide 10,14 or PA10,14), nylon 10,18 (polyamide 10,18 or PA10,18), nylon 6,18 (polyamide 6,18 or PA6,18), nylon 6,12 (polyamide 6,12 or PA6,12), nylon 6,14 (polyamide 6,14 or PA6,14), nylon 12,12 (polyamide 12,12 or PA12,12), and the like, and any combination thereof. Copolyamides may also be used. Examples of copolyamides include, but are not limited to, PA 11/10,10, PA 6/11, PA 6,6/6, PA 11/12, PA 10,10/10,12, PA 10,10/10,14, PA 11/10,36, PA 11/6,36, PA 10,10/10,36, PA 6T/6,6, and the like, and any combination thereof. A polyamide followed by a first number comma second number is a polyamide having the first number of backbone carbons between the nitrogens for the section having no pendent =O and the second number of backbone carbons being between the two nitrogens for the section having the pendent =O. By way of nonlimiting example, nylon 6,10 is [NH—(CH$_2$)$_6$—NH—CO—(CH$_2$)$_8$—CO]$_n$. A polyamide followed by number(s) backslash number(s) are a copolymer of the polyamides indicated by the numbers before and after the backslash.

Examples of polyurethanes include, but are not limited to, polyether polyurethanes, polyester polyurethanes, mixed polyether and polyester polyurethanes, and the like, and any combination thereof. Examples of thermoplastic polyurethanes include, but are not limited to, poly[4,4'-methylenebis(phenylisocyanate)-alt-1,4-butanediol/di(propylene glycol)/polycaprolactone], ELASTOLLAN™ 1190A (a polyether polyurethane elastomer, available from BASF), ELASTOLLAN™ 1190A10 (a polyether polyurethane elastomer, available from BASF), and the like, and any combination thereof.

Compatibilizers may optionally be used to improve the blending efficiency and efficacy thermoplastic polyester with one or more thermoplastic polymers. Examples of polymer compatibilizers include, but not limited to, PROPOLDER™ MPP2020 20 (polypropylene, available from Polygroup Inc.), PROPOLDER™ MPP2040 40 (polypropylene, available from Polygroup Inc.), NOVACOM™ HFS2100 (maleic anhydride functionalized high density polyethylene polymer, available from Polygroup Inc.), KEN-REACT™ CAPS™ L™ 12/L (organometallic coupling agent, available from Kenrich Petrochemicals), KEN-REACT™ CAPOW™ L™ 12/H (organometallic coupling agent, available from Kenrich Petrochemicals), KEN-REACT™ LICA™ 12 (organometallic coupling agent, available from Kenrich Petrochemicals), KEN-REACT™ CAPS™ KPR™ 12/LV (organometallic coupling agent, available from Kenrich Petrochemicals), KEN-REACT™ CAPOW™ KPR™ 12/H (organometallic coupling agent, available from Kenrich Petrochemicals), KEN-REACT™ titanates & zirconates (organometallic coupling agent, available from Kenrich Petrochemicals), VISTAMAXX™ (ethylene-propylene copolymers, available from ExxonMobil), SANTOPRENE™ (thermoplastic vulcanizate of ethylene-propylene-diene rubber and polypropylene, available from ExxonMobil), VISTALON™ (ethylene-propylene-diene rubber, available from ExxonMobil), EXACT™ (plastomers, available from ExxonMobil) EXXELOR™ (polymer resin, available from ExxonMobil), FUSABOND™ M603 (random ethylene copolymer, available from Dow), FUSABOND™ E226 (anhydride modified polyethylene, available from Dow), BYNEL™ 41E710 (coextrudable adhesive resin, available from Dow), SURLYN™ 1650 (ionomer resin, available from Dow), FUSABOND™ P353 (a chemically modified polypropylene copolymer, available from Dow), ELVALOY™ PTW (ethylene terpolymer, available from Dow), ELVALOY™ 3427AC (a copolymer of ethylene and butyl acrylate, available from Dow), LOTADER™ AX8840 (ethylene acrylate-based terpolymer, available from Arkema), LOTADER™ 3210 (ethylene acrylate-based terpolymer, available from Arkema), LOTADER™ 3410 (ethylene acrylate-based terpolymer, available from Arkema), LOTADER™ 3430 (ethylene acrylate-based terpolymer, available from Arkema), LOTADER™ 4700 (ethylene acrylate-based terpolymer, available from Arkema), LOTADER™ AX8900 (ethylene acrylate-based terpolymer, available from Arkema), LOTADER™ 4720 (ethylene acrylate-based terpolymer, available from Arkema), BAXXODUR™ EC 301 (amine for epoxy, available from BASF), BAXXODUR™ EC 311 (amine for epoxy, available from BASF), BAXXODUR™ EC 303 (amine for epoxy, available from BASF), BAXXODUR™ EC 280 (amine for epoxy, available from BASF), BAXXODUR™ EC 201 (amine for epoxy, available from BASF), BAXXODUR™ EC 130 (amine for epoxy, available from BASF), BAXXODUR™ EC 110 (amine for epoxy, available from BASF), styrenics, polypropylene, polyamides, polycarbonate, EASTMAN™ G-3003 (a maleic anhydride grafted polypropylene, available from Eastman), RETAIN™ (polymer modifier available from Dow), AMPLIFY TY™ (maleic anhydride grafted polymer, available from Dow), INTUNE™ (olefin block copolymer, available from Dow), and the like and any combination thereof.

The thermoplastic polymers may have a melting point or softening temperature of about 50° C. to about 450° C. (or about 50° C. to about 125° C., or about 100° C. to about 175° C., or about 150° C. to about 280° C., or about 200° C. to about 350° C., or about 300° C. to about 450° C.).

The thermoplastic polymers may have a glass transition temperature (ASTM E1356-08(2014) with 10° C./min ramping and cooling rates) of about −50° C. to about 400° C. (or about −50° C. to about 0° C., or about −25° C. to about 50° C., or about 0° C. to about 150° C., or about 100° C. to about 250° C., or about 150° C. to about 300° C., or about 200° C. to about 400° C.).

The polymer 202 may optionally comprise an additive. Typically, the additive would be present before addition of the polymer 202 to the mixture 210. Therefore, in the polymer melt droplets and resultant polymer particles, the additive is dispersed throughout the polymer. Accordingly, for clarity, this additive is referred to herein as an "internal additive." The internal additive may be blended with the polymer just prior to making the mixture 210 or well in advance.

When describing component amounts in the compositions described herein (e.g., the mixture 210 and polymer particles 222), a weight percent based on the polymer 202 is not inclusive of the internal additive. For example, a composition comprising 1 wt % of emulsion stabilizer by weight of 100 g of a polymer 202 comprising 10 wt % internal additive and 90 wt % polymer is a composition comprising 0.9 g of emulsion stabilizer, 90 g of polymer, and 10 g of internal additive.

The internal additive may be present in the polymer 202 at about 0.1 wt % to about 60 wt % (or about 0.1 wt % to about 5 wt %, or about 1 wt % to about 10 wt %, or about 5 wt % to about 20 wt %, or about 10 wt % to about 30 wt %, or about 25 wt % to about 50 wt %, or about 40 wt % to about 60 wt %) of the polymer 202. For example, the polymer 202 may comprise about 70 wt % to about 85 wt % of a polymer and about 15 wt % to about 30 wt % of an internal additive like glass fiber or carbon fiber.

Examples of internal additives include, but are not limited to, fillers, strengtheners, pigments, pH regulators, and the like, and combinations thereof. Examples of fillers include, but are not limited to, glass fibers, glass particles, mineral fibers, carbon fibers, oxide particles (e.g., titanium dioxide and zirconium dioxide), metal particles (e.g., aluminum powder), and the like, and any combination thereof. Examples of pigments include, but are not limited to, organic pigments, inorganic pigments, carbon black, and the like, and any combination thereof.

The polymer 202 may be present in the mixture 210 at about 5 wt % to about 60 wt % (or about 5 wt % to about 25 wt %, or about 10 wt % to about 30 wt %, or about 20 wt % to about 45 wt %, or about 25 wt % to about 50 wt %, or about 40 wt % to about 60 wt %) of the polymer 202, carrier fluid 204, and the dispersing fluid 206 combined.

Suitable carrier fluids 204 have a viscosity at 25° C. of about 1,000 cSt to about 150,000 cSt (or about 1,000 cSt to about 60,000 cSt, or about 40,000 cSt to about 100,000 cSt, or about 75,000 cSt to about 150,000 cSt).

Examples of carrier fluids 204 include, but are not limited to, silicone oil, fluorinated silicone oils, perfluorinated silicone oils, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof. Examples of silicone oils include, but are not limited to, polydimethylsiloxane, methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and the like, and any combination thereof. Suitable carrier fluids (individual or as mixtures) should be chosen so as not to decompose at the melt emulsion processing temperature.

Suitable dispersing fluids 206 have a viscosity at 25° C. of about 1,000 cSt to about 150,000 cSt (or about 1,000 cSt to about 60,000 cSt, or about 40,000 cSt to about 100,000 cSt, or about 75,000 cSt to about 150,000 cSt).

Examples of dispersing fluids 206 include, but are not limited to, polyethylene glycols, alkyl-terminal polyethylene glycols (e.g., C1-C4 terminal alkyl groups like tetraethylene glycol dimethyl ether (TDG)), esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof.

It should be noted that some carrier fluid 204 and dispersing fluid 206 compositions, in general terms, overlap because some compositions within these general categories can be used as carrier fluids 204 and others as dispersing fluids 206 (e.g., based on the degree of modification and/or the type of modification (e.g., carbon chain length)). The $d_p$ of the exact composition will determine if the composition is a carrier fluid 204 or dispersing fluid 206.

Polyesters are susceptible to hydrolysis. Accordingly, water present during the melt emulsification production of the thermoplastic polyester particles may degrade the thermoplastic polyester, which may have consequences in the application of the thermoplastic polyester particles, for example, in additive manufacturing. Therefore, preferred carrier fluids 204 include, but are not limited to, silicone oil, fluorinated silicone oils, perfluorinated silicone oils, paraffins, liquid petroleum jelly, vison oils, turtle oils, soya bean oils, perhydrosqualene, calophyllum oils, palm oils, parleam oils, maize oils, sunflower oils, apricot oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof. Further, preferred dispersing fluids 206 include, but are not limited to, alkyl-terminal polyethylene glycols. By way of nonlimiting example, a carrier fluid may comprise a silicone oil and an alkyl-terminal polyethylene glycol.

The weight ratio of the carrier fluid and the dispersing fluid may be about 1:3 to about 10:1 (or about 1:2 to about 5:1, or about 1:1 to about 3:1). Without being limited by theory, it is believed that higher concentrations of dispersing fluid may result in smaller diameter particles. While other conditions (e.g., viscosity of each fluid, temperature, mixing speed, and the like) may play a role in producing lower diameter particles, a weight ratio of the carrier fluid and the dispersing fluid of about 1:3 to about 3:1 may be suitable for producing smaller diameter particles.

The weight ratio of the dispersing fluid to the thermoplastic polyester may be about 1:5 to about 10:1 (or about 1:3 to about 1:1, or about 1:2 to about 3:1, or about 1:1 to about 5:1, or about 3:1 to about 10:1). Without being limited by theory, it is believed that higher concentrations of thermoplastic polyester may result in smaller diameter particles. While other conditions (e.g., viscosity of each fluid, temperature, mixing speed, and the like) may play a role in producing lower diameter particles, a weight ratio of the dispersing fluid to the thermoplastic polyester of about 1:5 to about 2:1 may be suitable for producing smaller diameter particles.

The carrier fluid 204 may be present in the mixture 210 at about 40 wt % to about 95 wt % (or about 75 wt % to about 95 wt %, or about 70 wt % to about 90 wt %, or about 55 wt % to about 80 wt %, or about 50 wt % to about 75 wt %, or about 40 wt % to about 60 wt %) of the polymer 202, the carrier fluid 204, and the dispersing fluid 206 combined. The dispersing fluid 204 may be present in the mixture 210 at about 5 wt % to about 40 wt % (or about 5 wt % to about 15 wt %, or about 10 wt % to about 25 wt %, or about 15 wt % to about 30 wt %, or about 20 wt % to about 40 wt %) of the polymer 202, the carrier fluid 204, and the dispersing fluid 206 combined.

In some instances, the carrier fluid 204 may have a density of about 0.6 g/cm$^3$ to about 1.5 g/cm$^3$, the dispersing fluid 206 may have a density of about 0.6 g/cm$^3$ to about 1.5 g/cm$^3$, and the polymer 202 has a density of about 0.7 g/cm$^3$ to about 1.7 g/cm$^3$, wherein the polymer has a density similar, lower, or higher than the density of the carrier fluid and/or dispersing fluid.

The emulsion stabilizers may be used in the methods and compositions of the present disclosure and may comprise nanoparticles (e.g., oxide nanoparticles, carbon black, polymer nanoparticles, and combinations thereof), surfactants, and the like, and any combination thereof.

Oxide nanoparticles may be metal oxide nanoparticles, non-metal oxide nanoparticles, or mixtures thereof. Examples of oxide nanoparticles include, but are not limited to, silica, titania, zirconia, alumina, iron oxide, copper oxide, tin oxide, boron oxide, cerium oxide, thallium oxide, tungsten oxide, and the like, and any combination thereof. Mixed metal oxides and/or non-metal oxides, like aluminosilicates, borosilicates, and aluminoborosilicates, are also inclusive in the term metal oxide. The oxide nanoparticles may by hydrophilic or hydrophobic, which may be native to the particle or a result of surface treatment of the particle. For example, a silica nanoparticle having a hydrophobic surface treatment, like dimethyl silyl, trimethyl silyl, and the like, may be used in methods and compositions of the present disclosure. Additionally, silica with functional surface treatments like methacrylate functionalities may be used in methods and compositions of the present disclosure. Unfunctionalized oxide nanoparticles may also be suitable for use as well.

Commercially available examples of silica nanoparticles include, but are not limited to, AEROSIL™ particles available from Evonik (e.g., AEROSIL™ R812S (about 7 nm average diameter silica nanoparticles having a hydrophobically modified surface and a BET surface area of 260±30 m$^2$/g), AEROSIL™ RX50 (about 40 nm average diameter silica nanoparticles having a hydrophobically modified surface and a BET surface area of 35±10 m$^2$/g), AEROSIL™ 380 (silica nanoparticles having a hydrophilically modified surface and a BET surface area of 380±30 m$^2$/g), and the like, and any combination thereof.

Carbon black is another type of nanoparticle that may be present as an emulsion stabilizer in the compositions and methods disclosed herein. Various grades of carbon black will be familiar to one having ordinary skill in the art, any of which may be used herein. Other nanoparticles capable of absorbing infrared radiation may be used similarly.

Polymer nanoparticles are another type of nanoparticle that may be present as an emulsion stabilizer in the disclosure herein. Suitable polymer nanoparticles may include one or more polymers that are thermosetting and/or crosslinked, such that they do not melt when processed by melt emulsification according to the disclosure herein. High molecular weight thermoplastic polymers having high melting or decomposition points may similarly comprise suitable polymer nanoparticle emulsion stabilizers.

The nanoparticles may have an average diameter (D50 based on volume) of about 1 nm to about 500 nm (or about 10 nm to about 150 nm, or about 25 nm to about 100 nm, or about 100 nm to about 250 nm, or about 250 nm to about 500 nm).

The nanoparticles may have a BET surface area of about 10 m$^2$/g to about 500 m$^2$/g (or about 10 m$^2$/g to about 150 m$^2$/g, or about 25 m$^2$/g to about 100 m$^2$/g, or about 100 m$^2$/g to about 250 m$^2$/g, or about 250 m$^2$/g to about 500 m$^2$/g).

Nanoparticles may be included in the mixture 210 at a concentration of about 0.01 wt % to about 10 wt % (or about 0.01 wt % to about 1 wt %, or about 0.1 wt % to about 3 wt %, or about 1 wt % to about 5 wt %, or about 5 wt % to about 10 wt %) based on the weight of the polymer 202.

Surfactants may be anionic, cationic, nonionic, or zwitterionic. Examples of surfactants include, but are not limited to, sodium dodecyl sulfate, sorbitan oleates, poly[dimethylsiloxane-co-[3-(2-(2-hydroxyethoxy)ethoxy)propylmethylsiloxane], docusate sodium (sodium 1,4-bis(2-ethylhexoxy)-1,4-dioxobutane-2-sulfonate), and the like, and any combination thereof. Commercially available examples of surfactants include, but are not limited to, CALFAX™ DB-45 (sodium dodecyl diphenyl oxide disulfonate, available from Pilot Chemicals), SPAN™ 80 (sorbitan maleate non-ionic surfactant), MERPOL™ surfactants (available from Stepan Company), TERGITOL™ TMN-6 (a water-soluble, nonionic surfactant, available from DOW), TRITON™ X-100 (octyl phenol ethoxylate, available from SigmaAldrich), IGEPAL™ CA-520 (polyoxyethylene (5) isooctylphenyl ether, available from SigmaAldrich), BRIJ™ S10 (polyethylene glycol octadecyl ether, available from SigmaAldrich), and the like, and any combination thereof.

Surfactants may be included in the mixture 210 at a concentration of about 0.01 wt % to about 10 wt % (or about 0.01 wt % to about 1 wt %, or about 0.5 wt % to about 2 wt %, or about 1 wt % to about 3 wt %, or about 2 wt % to about 5 wt %, or about 5 wt % to about 10 wt %) based on the weight of the polymer 202. Alternatively, the mixture 210 may comprise no (or be absent of) surfactant.

A weight ratio of nanoparticles to surfactant may be about 1:10 to about 10:1 (or about 1:10 to about 1:1, or about 1:5 to about 5:1, or about 1:1 to about 10:1).

As described above, the components 202, 204, and 206 and emulsion stabilizer (when used) can be added in any order and include mixing and/or heating during the process of combining 208 the components 202, 204, and 206. For example, the dispersing fluid 206 may first be dispersed in the carrier fluid 204, optionally with heating said dispersion, before adding the polymer 202 and emulsion stabilizer. In another nonlimiting example, the polymer 202 may be heated to produce a polymer melt to which the carrier fluid 204, dispersing fluid 106, and emulsion stabilizer are added together or in succession. In yet another nonlimiting example, the dispersing fluid 206 and carrier fluid 204 can be mixed at a temperature greater than the melting point or softening temperature of the polymer 202 and at a shear rate sufficient enough to disperse the polymer melt in the dispersing fluid 206. Then, the emulsion stabilizer can be added to form the mixture 210 and maintained at suitable process conditions for a set period of time.

Combining 208 the components 202, 204, and 206 and emulsion stabilizer (when used) in any combination can occur in a mixing apparatus used for the processing 212 and/or another suitable vessel. By way of nonlimiting example, the polymer 202 may be heated to a temperature greater than the melting point or softening temperature of the polymer 202 in the mixing apparatus used for the processing 212, and the dispersing fluid 206 may be dispersed in the carrier fluid 204 in another vessel. Then, said dispersion may be added to the melt of the polymer 202 in the mixing apparatus used for the processing 212.

The mixing apparatuses used for the processing 212 to produce the melt emulsion 214 should be capable of maintaining the melt emulsion 214 at a temperature greater than the melting point or softening temperature of the polymer 202 and applying a shear rate sufficient to disperse the polymer melt in the dispersing fluid 206 as droplets.

Examples of mixing apparatuses used for the processing 212 to produce the melt emulsion 214 include, but are not limited to, extruders (e.g., continuous extruders, batch extruders, and the like), stirred reactors, blenders, reactors with inline homogenizer systems, and the like, and apparatuses derived therefrom.

Processing 212 and forming the melt emulsion 214 at suitable process conditions (e.g., temperature, shear rate, and the like) for a set period of time.

The temperature of processing 212 and forming the melt emulsion 214 should be a temperature greater than the melting point or softening temperature of the polymer 202 and less than the decomposition temperature of any components 202, 204, and 206 in the mixture 210. For example, the temperature of processing 212 and forming the melt emulsion 214 may be about 1° C. to about 50° C. (or about 1° C. to about 25° C., or about 5° C. to about 30° C., or about 20° C. to about 50° C.) greater than the melting point or softening temperature of the polymer 202, provided the temperature of processing 212 and forming the melt emulsion 214 is less than the decomposition temperature of any components 202, 204, and 206 in the mixture 210.

The shear rate of processing 212 and forming the melt emulsion 214 should be sufficiently high to disperse the polymer melt in the dispersing fluid 206 as droplets. Said droplets should comprise droplets having a diameter of about 1000 µm or less (or about 1 µm to about 1000 µm, or about 1 µm to about 50 µm, or about 10 µm to about 100 µm, or about 10 µm to about 250 µm, or about 50 µm to about 500 µm, or about 250 µm to about 750 µm, or about 500 µm to about 1000 µm).

The time for maintaining said temperature and shear rate for processing 212 and forming the melt emulsion 214 may be 10 seconds to 18 hours or longer (or 10 seconds to 30 minutes, or 5 minutes to 1 hour, or 15 minutes to 2 hours, or 1 hour to 6 hours, or 3 hours to 18 hours). Without being limited by theory, it is believed that a steady state of droplet sizes will be reached, at which point processing 212 can be stopped. That time may depend on, among other things, the temperature, shear rate, polymer 202 composition, the carrier fluid 204 composition, the dispersing fluid 206 composition, and the emulsion stabilizer composition.

The melt emulsion 214 may then be cooled 216. Cooling 216 can be slow (e.g., allowing the melt emulsion to cool under ambient conditions) to fast (e.g., quenching). For example, the rate of cooling may range from about 10° C./hour to about 100° C./second to almost instantaneous with quenching (for example in dry ice) (or about 10° C./hour to about 60° C./hour, or about 0.5° C./minute to about 20° C./minute, or about 1° C./minute to about 5° C./minute, or about 10° C./minute to about 60° C./minute, or about 0.5° C./second to about 10° C./second, or about 10° C./second to about 100° C./second).

During cooling, little to no shear may be applied to the melt emulsion 214. In some instances, the shear applied during heating may be applied during cooling.

The cooled mixture 218 resulting from cooling 216 the melt emulsion 214 comprises solidified polymer particles 222 (or simply polymer particles) and other components 224 (e.g., the carrier fluid 204, dispersing fluid 206, excess emulsion stabilizer, and the like). The polymer particles may be dispersed in the carrier fluid or settled in the carrier fluid.

The cooled mixture 218 may then be treated 220 to the separate polymer particles 222 (or simply polymer particles 222) from the other components 224. Suitable treatments include, but are not limited to, washing, filtering, centrifuging, decanting, and the like, and any combination thereof.

Solvents used for washing the polymer particles 222 should generally be (a) miscible with the carrier fluid 204 and/or dispersing fluid 206 and (b) nonreactive (e.g., non-swelling and non-dissolving) with the polymer 202. The choice of solvent will depend on, among other things, the composition of the carrier fluid, the composition of the dispersing fluid, and the composition of the polymer 202.

Examples of solvents include, but are not limited to, hydrocarbon solvents (e.g., pentane, hexane, heptane, octane, cyclohexane, cyclopentane, decane, dodecane, tridecane, and tetradecane), aromatic hydrocarbon solvents (e.g., benzene, toluene, xylene, 2-methyl naphthalene, and cresol), ether solvents (e.g., diethyl ether, tetrahydrofuran, diisopropyl ether, and dioxane), ketone solvents (e.g., acetone and methyl ethyl ketone), alcohol solvents (e.g., methanol, ethanol, isopropanol, and n-propanol), ester solvents (e.g., ethyl acetate, methyl acetate, butyl acetate, butyl propionate, and butyl butyrate), halogenated solvents (e.g., chloroform, bromoform, 1,2-dichloromethane, 1,2-dichloroethane, carbon tetrachloride, chlorobenzene, and hexafluoroisopropanol), water, and the like, and any combination thereof.

Solvent may be removed from the polymer particles 222 by drying using an appropriate method such as air drying, heat drying, reduced pressure drying, freeze drying, or a hybrid thereof. The heating may be performed preferably at a temperature lower than the glass transition point of the polymer (e.g., about 50° C. to about 150° C.).

The polymer particles 222 after separation from the other components 224 may optionally be further classified to produce purified polymer particles 228. For example, to narrow the particle size distribution (or reduce the diameter span), the polymer particles 222 can be passed through a sieve having a pore size of about 10 µm to about 250 µm (or about 10 µm to about 100 µm, or about 50 µm to about 200 µm, or about 150 µm to about 250 µm).

In another example of purification technique, the polymer particles 222 may be washed with water to remove surfactant while maintaining substantially all of the nanoparticles associated with the surface of the polymer particles 222. In yet another example of purification technique, the polymer particles 222 may be blended with additives to achieve a desired final product. For clarity, because such additives are blended with the particles 222 or other particles resultant from the methods described herein after the particles are solidified, such additives are referred to herein as "external additives." Examples of external additives include flow aids, other polymer particles, fillers, and the like, and any combination thereof.

In some instances, a surfactant used in making the polymer particles 222 may be unwanted in downstream applications. Accordingly, yet another example of purification technique may include at least substantial removal of the surfactant from the polymer particles 222 (e.g., by washing and/or pyrolysis).

The polymer particles 222 and/or purified polymer particles 228 (referred to as particles 222/228) may be characterized by composition, physical structure, and the like.

As described above, the emulsion stabilizers are at the interface between the polymer melt and the carrier fluid. As a result, when the mixture is cooled, the emulsion stabilizers remain at, or in the vicinity of, said interface. Therefore, the structure of the particles 222/228, in general, includes emulsion stabilizers (a) dispersed on an outer surface of the particles 222/228 and/or (b) embedded in an outer portion (e.g., outer 1 vol %) of the particles 222/228.

Further, where voids form inside the polymer melt droplets, emulsion stabilizers should generally be at (and/or embedded in) the interface between the interior of the void and the polymer. The voids generally do not contain the polymer. Rather, the voids may contain, for example, carrier fluid, air, or be void. The particles 222/228 may comprise carrier fluid at about 5 wt % or less (or about 0.001 wt % to about 5 wt %, or about 0.001 wt % to about 0.1 wt %, or about 0.01 wt % to about 0.5 wt %, or about 0.1 wt % to about 2 wt %, or about 1 wt % to about 5 wt %) of the particles 222/228.

The polymer 202 may be present in the particles 222/228 at about 90 wt % to about 99.5 wt % (or about 90 wt % to about 95 wt %, or about 92 wt % to about 97 wt %, or about 95 wt % to about 99.5 wt %) of the particles 222/228.

The emulsion stabilizers, when used, may be present in the particles 222/228 at about 10 wt % or less (or about 0.01 wt % to about 10 wt %, or about 0.01 wt % to about 1 wt %, or about 0.5 wt % to about 5 wt %, or about 3 wt % to about 7 wt %, or about 5 wt % to about 10 wt %) of the particles 222/228. When purified to at least substantially remove surfactant or another emulsion stabilizer, the emulsion stabilizers 206 may be present in the particles 228 at less than 0.01 wt % (or 0 wt % to about 0.01 wt %, or 0 wt % to 0.001 wt %).

Upon forming polymer particulates according to the disclosure herein, at least a portion of the nanoparticles, such as silica nanoparticles, may be disposed as a coating upon the outer surface of the polymer particulates. At least a portion of the surfactant, if used, may be associated with the outer surface as well. The coating may be disposed substantially uniformly upon the outer surface. As used herein with respect to a coating, the term "substantially uniform" refers to an even coating thickness in surface locations covered by the coating composition (e.g., nanoparticles and/or surfactant), particularly the entirety of the outer surface. The emulsion stabilizers 206 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the particles 222/228. When purified to at least substantially remove surfactant or another emulsion stabilizer, the emulsion stabilizers 206 may be present in the particles 228 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the particles 228. The coverage of the emulsion stabilizers 206 on an outer surface of the particles 222/228 may be determined using image analysis of the scanning electron microscope images (SEM micrographs). The emulsion stabilizers 206 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the particles 222/228. When purified to at least substantially remove surfactant or another emulsion stabilizer, the emulsion stabilizers 206 may be present in the particles 228 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the particles 228. The coverage of the emulsion stabilizers 206 on an outer surface of the particles 222/228 may be determined using image analysis of the SEM micrographs.

The particles 222/228 may have a D10 of about 0.1 µm to about 125 µm (or about 0.1 µm to about 5 µm, about 1 µm to about 10 µm, about 5 µm to about 30 µm, or about 1 µm to about 25 µm, or about 25 µm to about 75 µm, or about 50 µm to about 85 µm, or about 75 µm to about 125 µm), a D50 of about 0.5 µm to about 200 µm (or about 0.5 µm to about 10 µm, or about 5 µm to about 50 µm, or about 30 µm to about 100 µm, or about 30 µm to about 70 µm, or about 25 µm to about 50 µm, or about 50 µm to about 100 µm, or about 75 µm to about 150 µm, or about 100 µm to about 200 µm), and a D90 of about 3 µm to about 300 µm (or about 3 µm to about 15 µm, or about 10 µm to about 50 µm, or about 25 µm to about 75 µm, or about 70 µm to about 200 µm, or about 60 µm to about 150 µm, or about 150 µm to about 300 µm), wherein D10<D50<D90. The particles 222/228 may also have a diameter span of about 0.4 to about 3 (or about 0.6 to about 2, or about 0.4 to about 1.5, or about 1 to about 3). Without limitation, diameter span values of 1.0 or greater are considered broad, and diameter spans values of 0.75 or less are considered narrow. For example, the particles 222/228 may have a D10 of about 5 µm to about 30 µm, a D50 of about 30 µm to about 100 µm, and a D90 of about 70 µm to about 120 µm, wherein D10<D50<D90. Said particles 222/228 may have a diameter span of about 0.5 to about 2.5.

The particles 222/228 may have a circularity of about 0.7 or greater (or about 0.7 to about 0.95, or about 0.90 to about 1.0, or about 0.93 to about 0.99, or about 0.95 to about 0.99, or about 0.97 to about 0.99, or about 0.98 to 1.0).

The particles 222/228 may have an angle of repose of about 20° to about 45° (or about 20° to about 30°, or about 25° to about 35°, or about 30° to about 40°, or about 35° to about 45°).

The particles 222/228 may have a Hausner ratio of about 1.0 to about 1.5 (or about 1.0 to about 1.2, or about 1.1 to about 1.3, or about 1.2 to about 1.35, or about 1.3 to about 1.5).

The particles 222/228 may have a bulk density of about 0.3 g/cm$^3$ to about 0.8 g/cm$^3$ (or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$).

Depending on the temperature and shear rate of processing 212 and the composition and relative concentrations of the components 202, 204, and 206, different shapes of the structures that compose the particles 222/228 have been observed. Typically, the particles 222/228 comprise substantially spherical particles (having a circularity of about 0.97 or greater). However, other structures including disc and elongated structures have been observed in the particles 222/228. Therefore, the particles 222/228 may comprise one or more of: (a) substantially spherical particles having a circularity of 0.97 or greater, (b) disc structures having an aspect ratio of about 2 to about 10, and (c) elongated structures having an aspect ratio of 10 or greater. Each of the (a), (b), and (c) structures have emulsion stabilizers dispersed on an outer surface of the (a), (b), and (c) structures and/or embedded in an outer portion of the (a), (b), and (c) structures. At least some of the (a), (b), and (c) structures may be agglomerated. For example, the (c) elongated structures may be laying on the surface of the (a) substantially spherical particles.

The particles 222/228 may have a sintering window that is within 10° C., preferably within 5° C., of the sintering window of the polymer 202 (comprising thermoplastic polyester and optionally one or more additional thermoplastic polymers). Again, polyesters are susceptible to hydrolysis, especially at the temperatures of the melt emulsification processes.

Applications of Polymer Particles Comprising Thermoplastic Polyester

The polymer particles described herein comprising thermoplastic polyester and optionally one or more additional thermoplastic polymers may be utilized in 3-D print processes, particularly those employing selective laser sintering to promote particulate consolidation. The polymer particles of the present disclosure may exhibit advantageous properties over polymer particulates having irregular shapes or wider particulate distributions, such as those available commercially. In nonlimiting examples, the polymer particles of the present disclosure may undergo consolidation at lower laser powers and afford a decreased extent of void formation in an object produced by 3-D printing.

3-D printing processes of the present disclosure may comprise: depositing polymer particles of the present disclosure upon a surface in a specified shape, and once deposited, heating at least a portion of the polymer particles to promote consolidation thereof and form a consolidated body (object), such that the consolidated body has a void percentage of about 1% or less after being consolidated. For example, heating and consolidation of the polymer particles may take place in a 3-D printing apparatus employing a laser, such that heating and consolidation take place by selective laser sintering.

Any of the polymer particles disclosed herein may be formulated in a composition suitable for 3-D printing. Choice of the composition and type of polymer particulate may be based upon various factors such as, but not limited to, the laser power used for selective laser sinter, the type of object being produced, and the intended use conditions for the object.

Examples of objects that may be 3-D printed using the polymer particles of the present disclosure include, but are not limited to, containers (e.g., for food, beverages, cosmetics, personal care compositions, medicine, and the like), shoe soles, toys, furniture parts and decorative home goods, plastic gears, screws, nuts, bolts, cable ties, automotive parts, medical items, prosthetics, orthopedic implants, aerospace/aircraft-related parts, production of artifacts that aid learning in education, 3-D anatomy models to aid in surgeries, robotics, biomedical devices (orthotics), home appliances, dentistry, electronics, sporting goods, and the like.

Other applications for the particulates of the present disclosure may include, but are not limited to, use as a filler in paints and powder coatings, inkjet materials and electrophotographic toners, and the like. In some instances, the particulates may have other preferred characteristics like diameter and span to be useful in said other applications.

Clauses

Clause 1. A method comprising: mixing a melt emulsion comprising (a) a continuous phase that comprises a carrier fluid having a polarity Hansen solubility parameter ($d_P$) of about 7 $MPa^{0.5}$ or less, (b) a dispersed phase that comprises a dispersing fluid having a $d_P$ of about 8 $MPa^{0.5}$ or more, and (c) an inner phase that comprises a thermoplastic polyester at a temperature greater than a melting point or softening temperature of the thermoplastic polyester and at a shear rate sufficiently high to disperse the thermoplastic polyester in the dispersed phase; and cooling the melt emulsion to below the melting point or softening temperature of the thermoplastic polyester to form solidified particles comprising the thermoplastic polyester.

Clause 2. The method of Clause 1, wherein the temperature of the mixing is about 200° C. to about 320° C.

Clause 3. The method of Clause 1, wherein cooling is to a temperature below 160° C.

Clause 4. The method of Clause 1, wherein the carrier fluid comprises one selected from the group consisting of: silicone oil, fluorinated silicone oils, perfluorinated silicone oils, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and any combination thereof.

Clause 5. The method of Clause 1, wherein the dispersing fluid comprises one selected from the group consisting of: polyethylene glycols, alkyl-terminal polyethylene glycols (e.g., C1-C4 terminal alkyl groups like tetraethylene glycol dimethyl ether (TDG)), esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and any combination thereof.

Clause 6. The method of Clause 1, wherein the carrier fluid comprises a silicone oil and the dispersing fluid comprises an alkyl-terminal polyethylene glycol.

Clause 7. The method of Clause 1, wherein a weight ratio of the carrier fluid to the dispersing fluid of about 1:3 to about 100:1.

Clause 8. The method of Clause 1, wherein the thermoplastic polyester is present at 90 wt % to 99.5 wt % of the solidified particles.

Clause 9. The method of Clause 1, wherein the mixture further comprises an emulsion stabilizer.

Clause 10. The method of Clause 9, wherein the emulsion stabilizer is associated with a surface of the solidified particles.

Clause 11. The method of Clause 10, wherein at least a portion of the emulsion stabilizer is embedded in the surface of the solidified particles.

Clause 12. The method of Clause 9, wherein the emulsion stabilizer comprises nanoparticles.

Clause 13. The method of Clause 9, wherein the solidified particles comprise have a void comprising the emulsion stabilizer at a void/thermoplastic polyester interface.

Clause 14. The method of Clause 1, wherein the solidified particles have a sintering window is within 5° C. of a sintering window of the thermoplastic polyester.

Clause 15. The method of Clause 1, wherein the solidified particles have a D10 of about 0.1 μm to about 125 μm, a D50 of about 0.5 μm to about 200 μm, and a D90 of about 3 μm to about 300 μm, wherein D10<D50<D90.

Clause 16. The method of Clause 15, wherein the solidified particles have a diameter span of about 0.4 to about 3.

Clause 17. The method of Clause 1, wherein the solidified particles have a D10 of about 0.5 μm to about 5 μm, a D50 of about 0.5 μm to about 10 μm, and a D90 of about 3 μm to about 15 μm, wherein D10<D50<D90.

Clause 18. The method of Clause 1, wherein the solidified particles have a D10 of about 1 μm to about 50 μm, a D50 of about 25 μm to about 100 μm, and a D90 of about 60 μm to about 300 μm, wherein D10<D50<D90.

Clause 19. The method of Clause 1, wherein the solidified particles have a D10 of about 5 μm to about 30 μm, a D50 of about 30 μm to about 100 μm, a D90 of about 70 μm to about 120 μm, and a diameter span of about 0.5 to about 2.5, wherein D10<D50<D90.

Clause 20. The method of Clause 1, wherein mixing occurs in an extruder.

Clause 21. The method of Clause 1, wherein mixing occurs in a stirred reactor under an inert gas environment.

Clause 22. The method of Clause 1, wherein the solidified particles have a circularity of about 0.90 to about 1.0.

Clause 23. The composition of Clause 1, wherein the solidified particles have a Hausner ratio of about 1.0 to about 1.5.

Clause 24. The method of Clause 1, wherein the thermoplastic polyester comprises one selected from the group consisting of: polybutylene terephthalate (PBT), polyethylene terephthalate (PET), polyethylene naphthalate (PEN), polytrimethylene terephthalate (PTT), polyhexamethylene terephthalate, and any combination thereof.

Clause 25. The method of Clause 1, wherein the mixture further comprises a thermoplastic polymer selected from the group consisting of: polyamides, polyurethanes, polyethylenes, polypropylenes, polyacetals, polycarbonates, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and any combination thereof.

Clause 26: The method of Clause 1, wherein a weight ratio of the carrier fluid and the dispersing fluid is about 1:3 to about 10:1 (or about 1:2 to about 5:1, or about 1:1 to about 3:1).

Clause 27: The method of Clause 1, wherein a weight ratio of the carrier fluid and the dispersing fluid is about 1:3 to about 3:1.

Clause 28: The method of Clause 1, wherein a weight ratio of the dispersing fluid to the thermoplastic polyester is about 1:5 to about 10:1 (or about 1:3 to about 1:1, or about 1:2 to about 3:1, or about 1:1 to about 5:1, or about 3:1 to about 10:1).

Clause 29: The method of Clause 1, wherein a weight ratio of the dispersing fluid to the thermoplastic polyester is about 1:5 to about 2:1.

Clause 29.5: The solidified particles produced by the method of Clause 1.

Clause 30. A composition comprising: particles comprising a thermoplastic polyester, wherein the particles have a sintering window that is within 5° C. of a sintering window of the thermoplastic polyester.

Clause 31. The composition of Clause 30, wherein the particles further comprise an emulsion stabilizer associated with an outer surface of the particles.

Clause 32. The composition of Clause 31, wherein the emulsion stabilizer comprises nanoparticles and at least some of the nanoparticles are embedded in the outer surface of the particles.

Clause 33. The composition of Clause 31, wherein at least some of the particles have a void comprising the emulsion stabilizer at a void/thermoplastic polymer interface.

Clause 34. The composition of Clause 31, wherein the emulsion stabilizer forms a coating that covers at least 50% of the surface of the particles.

Clause 35. The composition of Clause 30, wherein the thermoplastic polyester is present at 90 wt % to 99.5 wt % of the particles.

Clause 36. The composition of Clause 30, wherein the solidified particles have a D10 of about 0.1 μm to about 125 μm, a D50 of about 0.5 μm to about 200 μm, and a D90 of about 3 μm to about 300 μm, wherein D10<D50<D90.

Clause 37. The composition of Clause 36, wherein the solidified particles have a diameter span of about 0.4 to about 3.

Clause 38. The composition of Clause 30 or Clause 31 or Clause 32 or Clause 33 or Clause 34 or Clause 35, wherein the solidified particles have a D10 of about 0.5 μm to about 5 μm, a D50 of about 0.5 μm to about 10 μm, and a D90 of about 3 μm to about 15 μm, wherein D10<D50<D90.

Clause 39. The composition of Clause 30, wherein the solidified particles have a D10 of about 1 μm to about 50 μm, a D50 of about 25 μm to about 100 μm, and a D90 of about 60 μm to about 300 μm, wherein D10<D50<D90.

Clause 40. The composition of Clause 30, wherein the solidified particles have a D10 of about 5 μm to about 30 μm, a D50 of about 30 μm to about 100 μm, a D90 of about 70 μm to about 120 μm, and a diameter span of about 0.5 to about 2.5, wherein D10<D50<D90.

Clause 41. The composition of Clause 30, wherein the particles have a Hausner ratio of about 1.0 to about 1.5.

Clause 42. The composition of Clause 30, wherein the thermoplastic polyester comprises one selected from the group consisting of: polybutylene terephthalate (PBT), polyethylene terephthalate (PET), polyethylene naphthalate (PEN), polytrimethylene terephthalate (PTT), polyhexamethylene terephthalate, and any combination thereof.

Clause 43. The composition of Clause 30, wherein particles further comprise a thermoplastic polymer selected from the group consisting of: polyamides, polyurethanes, polyethylenes, polypropylenes, polyacetals, polycarbonates, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and any combination thereof.

Unless otherwise indicated, all numbers expressing quantities of ingredients, properties such as molecular weight, process conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1. A 100 mL glass kettle reactor equipped with overhead stirrer, impeller, heating mantle, condenser, nitrogen inlet and outlet, and electronic thermometer was charged with 14.97 g PDMS oil with the viscosity of 10,000 cSt (from Clearco Inc.) and 5.15 g tetraethylene glycol dimethyl ether (TGD) (from Sigma Aldrich). The mixture was heated up to between 250° C. and 255° C. while stirring at 350 rpm under slow $N_2$ stream. Then, 10.02 polybutylene terephthalate (PBT) pellets (melt viscosity 6,000 p, from Scientific Polymer Inc.) was added slowly (around 10 min) while keeping the reactor temperature between 250° C. to 255° C. and stirring at 350 rpm. The weight ratio of components was 3:2:1 for PDMS oil, PBT, and TGD, respectively. The mixture was stirred at 600 rpm at 250° C. for 1 hour then discharged in dry ice while keeping hot paste away from oxygen to avoid autoignition of TGD. After dry ice sublimation, silicone oil was removed via washing with hexane followed by centrifuging, where the washing/centrifuging cycle was performed three times. PBT spherical particles obtained with the average size of 30-40 μm. FIG. 3A is an optical micrograph of the particles of Example 1.

Example 2. A 500 mL glass kettle reactor equipped with overhead stirrer, impeller, heating mantle, condenser, nitrogen inlet and outlet, and electronic thermometer was charged with 150.0 g PDMS oil with the viscosity of 10,000 cSt and 50.0 g TGD and heated up to between 250° C. and 255° C. while stirring at 350 rpm under slow $N_2$ stream. Then 100.0 PBT pellets (melt viscosity 6,000 p) was added slowly (in around 10 min) while keeping the reactor temperature between 250° C. and 255° C. and stirring at 350 rpm. The ratio of components was 3:2:1 for PDMS oil, PBT, and TGD, respectively. The mixture was stirred at 600 rpm at 250° C. for 1 hour then discharged in dry ice while keeping hot paste away from oxygen to avoid autoignition of TGD. After dry ice sublimation, silicone oil was removed via three times washing/filtration by hexane. PBT spherical particles obtained with the average size of 100-150 μm. FIG. 3B is an optical micrograph of the particles of Example 2.

Figure 4A:
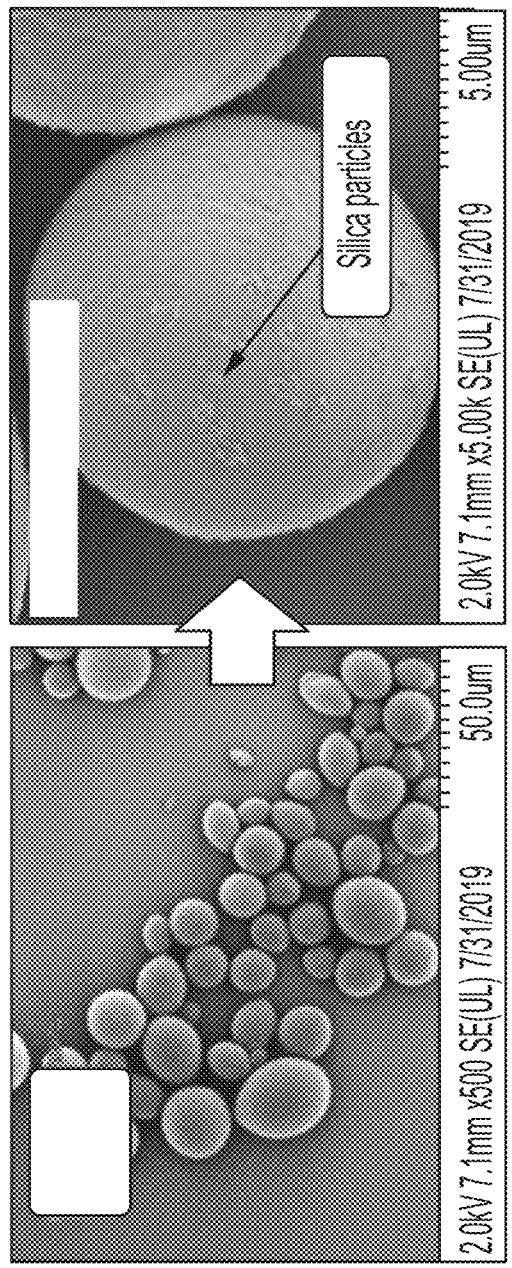
FIG. 4A is a scanning electron micrograph of the particles of Example 3.
Figure 5A:
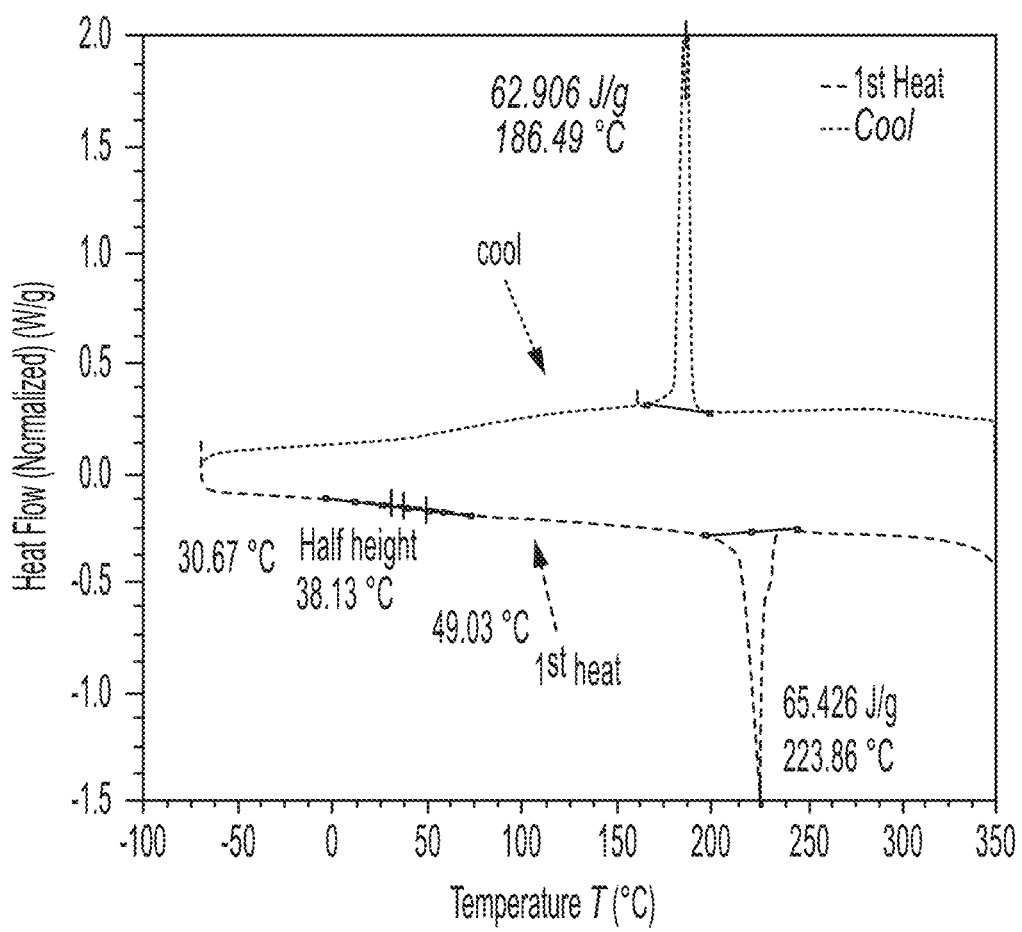
FIG. 5A is a differential scanning calorimetry thermograph of particles of Example 3.
Figure 5B:
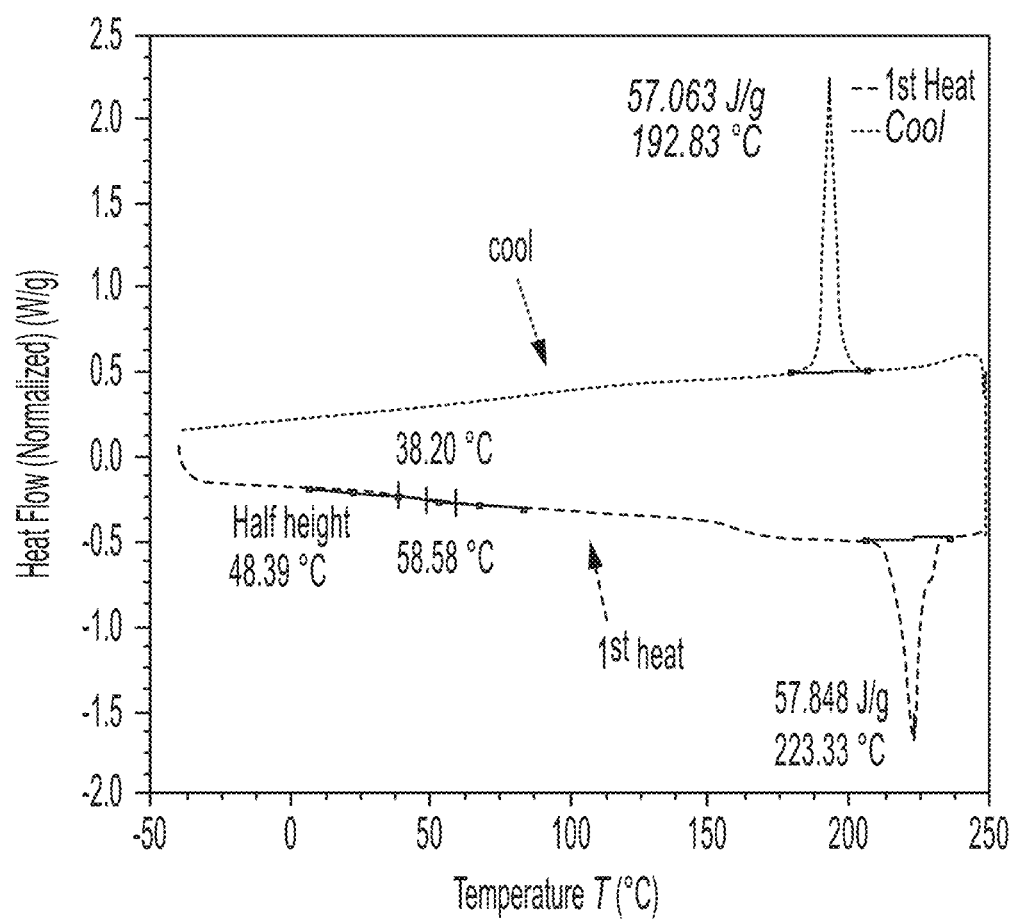
FIG. 5B is a differential scanning calorimetry thermograph of particles of Example 4.
Figure 5C:
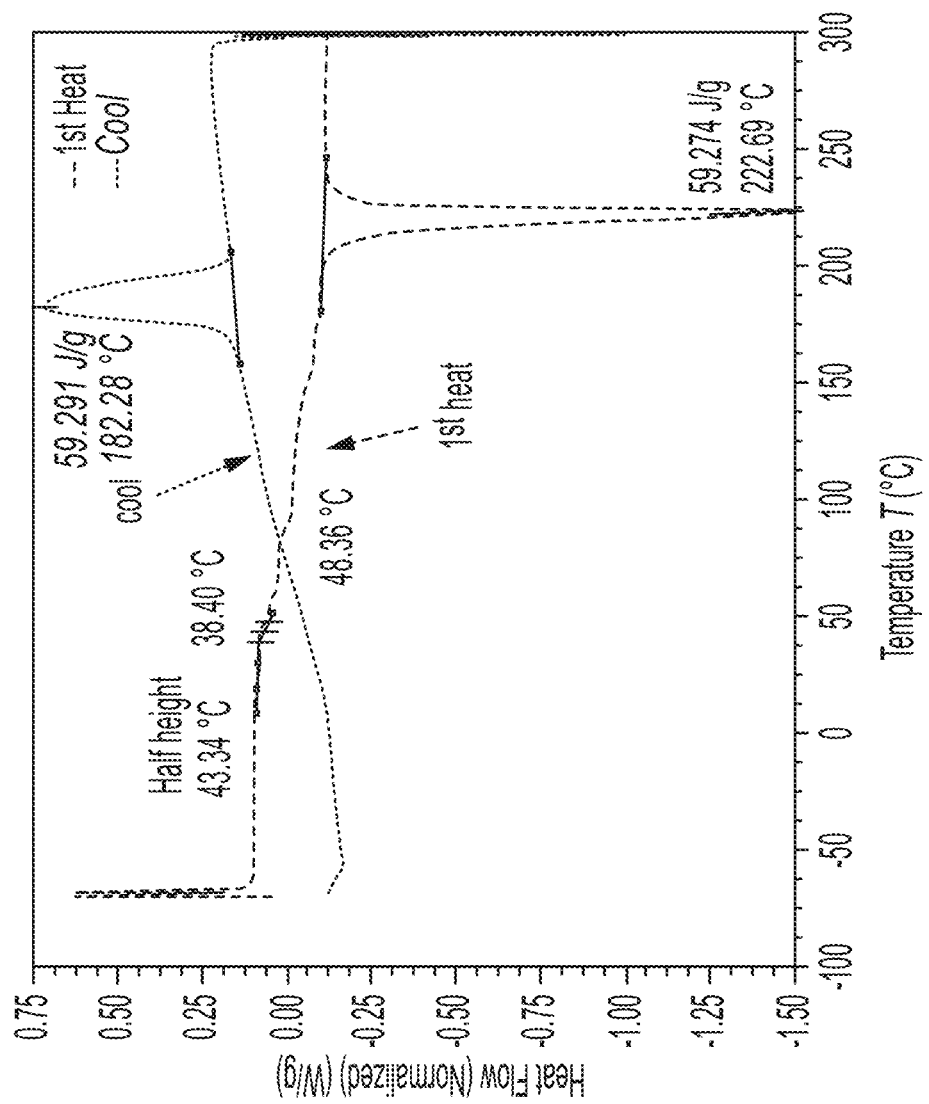
FIG. 5C is a differential scanning calorimetry thermograph of polybutylene terephthalate (PBT) starting material.

Example 3. A 100 mL glass kettle reactor equipped with overhead stirrer, impeller, heating mantle, condenser, nitrogen inlet and outlet and electronic thermometer was charged with 15.05 g PDMS oil with the viscosity of 10,000 cSt and 5.30 g TGD and heated up to between 250° C. and 255° C. while stirring at 300 rpm under slow $N_2$ stream. Then 10.02 PBT pellets (melt viscosity 6,000 p) was added slowly (in around 10 min) while keeping the reactor temperature between 250° C. and 255° C. and stirring at 300 rpm. The ratio of components was 3:2:1 for PDMS oil, PBT, and TGD, respectively. The mixture was stirred at 400 rpm at 250° C. for 1 hour. Then 0.05 g (0.5% w of PBT content) AEROSIL™ R812S silica additive (from Evonik) was added and stirred at 500 rpm at 250° C. for 15 minutes. Final product was cooled down to 200° C. and discharged in dry ice. At this temperature, discharging can be done safely. After dry ice sublimation, silicone oil was removed via washing with hexane followed by centrifuging, where the washing/centrifuging cycle was performed three times. PBT spherical particles obtained with the average size of 30-40 μm. Sintering window [(Tm−Tc)onset] was 26° C. and (Tm−Tc) was 38.4° C. FIG. 3C is an optical micrograph of the particles of Example 3. FIG. 4A is a scanning electron micrograph of the particles of Example 3. FIG. 5A is a differential scanning calorimetry thermograph of particles of Example 3 illustrating that their sintering window is not drastically unchanged from the PBT starting material, which is illustrated in FIG. 5C.

Figure 4B:
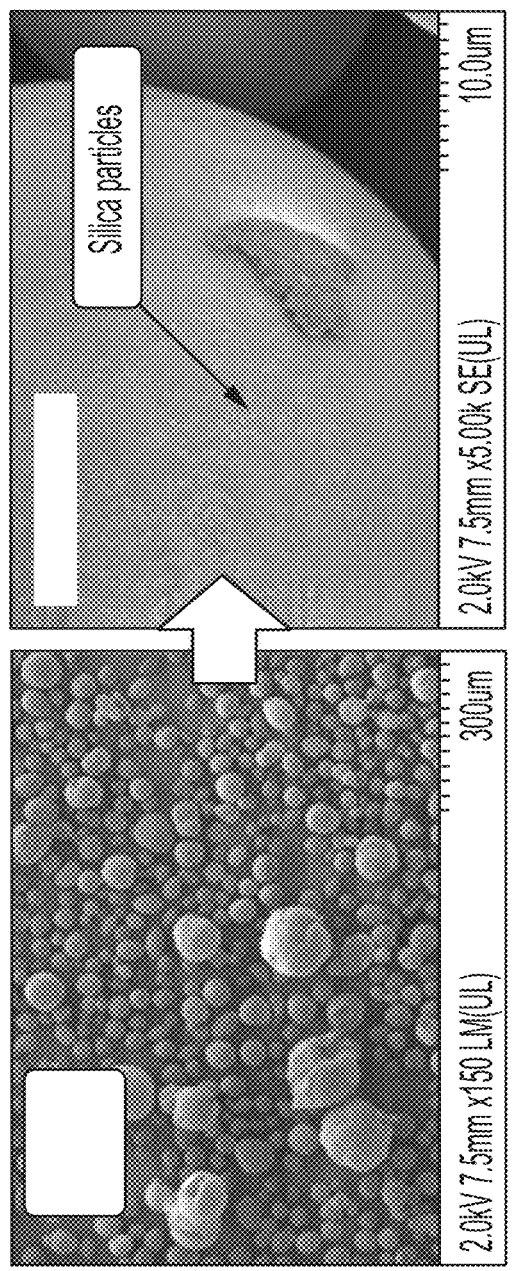
FIG. 4B is a scanning electron micrograph of the particles of Example 4.
Figure 6A:
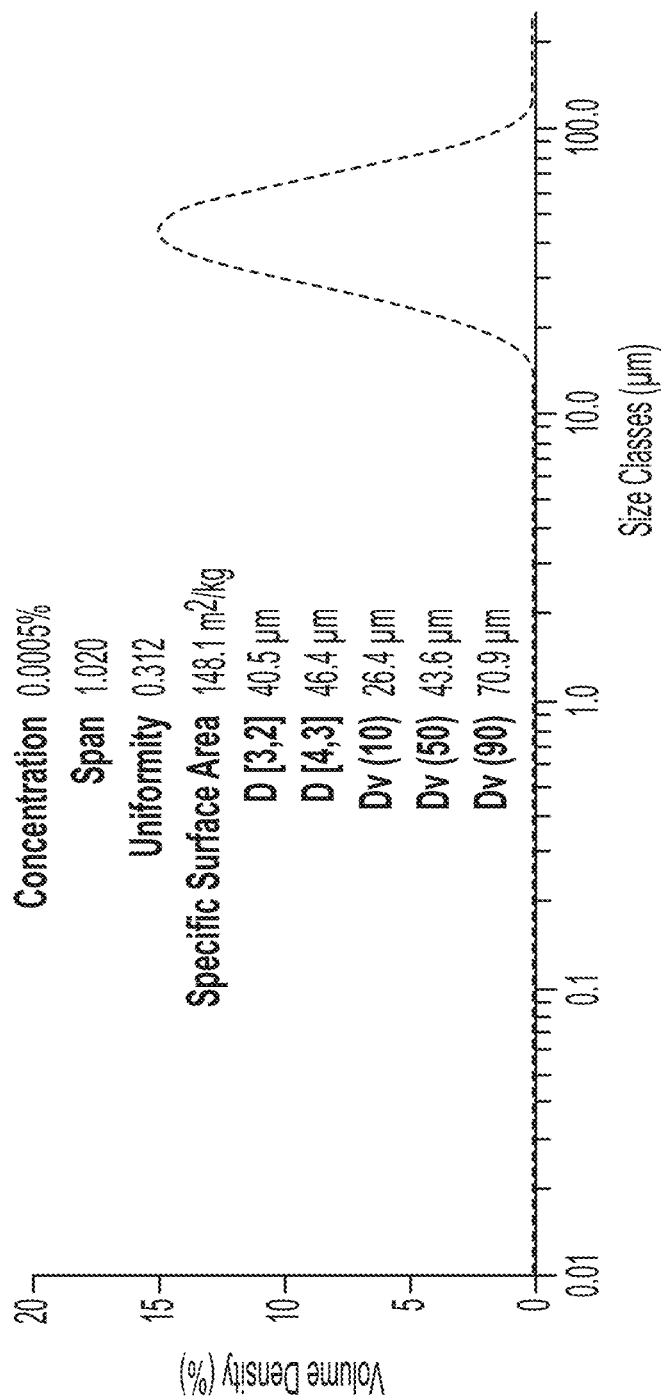
FIG. 6A is a plot of the particle size distribution for Example 4, including the size statistics.

Example 4. A 500 mL glass kettle reactor equipped with overhead stirrer, impeller, heating mantle, condenser, nitrogen inlet and outlet and electronic thermometer was charged with 75.38 g PDMS oil with the viscosity of 10,000 cSt and 25.58 g TGD and heated up to between 250° C. and 255° C. while stirring at 300 rpm under slow $N_2$ stream. Then 50.03 PBT pellets (melt viscosity 6,000 p) was added slowly (in around 10 min) while keeping the reactor temperature between 250° C. and 255° C. and stirring at 300 rpm. The ratio of components was 3:2:1 for PDMS oil, PBT, and TGD, respectively. The mixture was stirred at 400 rpm at 250° C. for 85 minutes. Then 0.28 g (0.5% w of PBT content) AEROSIL™ R812S silica additive was added and stirred at 500 rpm at 250° C. for 30 minutes. Final product was cooled down to 200° C. and discharged in dry ice. At this temperature, discharging can be done safely. After dry ice sublimation, silicone oil was removed via washing with hexane followed centrifuging, where the washing/centrifuging cycle was performed three times. PBT spherical particles obtained with the average size of 30-40 μm. Sintering window [(Tm−Tc)onset] was 17.9° C. and (Tm−Tc) was 30.5° C. FIG. 3D is an optical micrograph of the particles of Example 4. FIG. 4B is a scanning electron micrograph of the particles of Example 4. FIG. 5B is a differential scanning calorimetry thermograph of particles of Example 4 illustrating that their sintering window is not drastically unchanged from the PBT starting material, which is illustrated in FIG. 5C. FIG. 6A is a plot of the particle size distribution for Example 4 including the size statistics.

Example 5. A 500 mL glass kettle reactor equipped with overhead stirrer, impeller, heating mantle, condenser, nitrogen inlet and outlet and electronic thermometer was charged with 75.55 g PDMS oil with the viscosity of 10,000 cSt and 25.42 g TGD and heated up to between 250° C. and 255° C. while stirring at 350 rpm under slow $N_2$ stream. Then 50.07 PBT pellets (melt viscosity 6,000 p) was added slowly (in around 10 min) while keeping the reactor temperature between 250° C. and 255° C. and stirring at 350 rpm. The ratio of components was 3:2:1 for PDMS oil, PBT, and TGD, respectively. The mixture was stirred at 500 rpm at 250° C. for 85 minutes. Then 0.28 g (0.5% w of PBT content) AEROSIL™ RX50 silica additive (from Evonik) was added and stirred at 500 rpm at 250° C. for 30 minutes. Final product was cooled down to 200° C. and discharged in dry ice. At this temperature, discharging can be done safely. After dry ice sublimation, silicone oil was removed via washing with hexane followed by centrifuging, where the washing/centrifuging cycle was performed three times. PBT spherical particles obtained with the average size of 30-40 μm. FIG. 3E is an optical micrograph of the particles of Example 5.

Example 6. A 500 mL glass kettle reactor equipped with overhead stirrer, impeller, heating mantle, condenser, nitrogen inlet and outlet and electronic thermometer was charged with 75.06 g PDMS oil with the viscosity of 10,000 cSt and 26.07 g TGD and heated up to between 250° C. and 255° C. while stirring at 350 rpm under slow $N_2$ stream. Then 50.04 PBT pellets (melt viscosity 8,500 p) was added slowly (in around 10 min) while keeping the reactor temperature between 250° C. and 255° C. and stirring at 350 rpm. The ratio of components was 3:2:1 for PDMS oil, PBT, and TGD, respectively. The mixture was stirred at 500 rpm at 250° C. for 85 minutes. Then 0.28 g (0.5% w of PBT content) AEROSIL™ R812S silica additive was added and stirred at 500 rpm at 250° C. for 30 minutes. Final product was cooled down to 200° C. and discharged in dry ice. At this temperature, discharging can be done safely. After dry ice sublimation, silicone oil was removed via washing with hexane followed by centrifuging, where the washing/centrifuging cycle was performed three times. PBT spherical particles obtained with the average size of 80 μm. FIG. 3F is an optical micrograph of the particles of Example 6.

Example 7. A 500 mL glass kettle reactor equipped with overhead stirrer, impeller, heating mantle, condenser, nitrogen inlet and outlet and electronic thermometer was charged with 75.35 g PDMS oil with the viscosity of 10,000 cSt and 25.94 g TGD and heated up to between 250° C. and 255° C. while stirring at 350 rpm under slow $N_2$ stream. Then 50.09 PBT pellets (melt viscosity 8,500 p) was added slowly (in around 10 min) while keeping the reactor temperature between 250° C. and 255° C. and stirring at 350 rpm. The ratio of components was 3:2:1 for PDMS oil, PBT, and TGD, respectively. The mixture was stirred at 500 rpm at 250° C. for 85 minutes. Then 0.28 g (0.5% w of PBT content) AEROSIL™ RX50 silica additive was added and stirred at 500 rpm at 250° C. for 30 minutes. Final product was cooled down to 200° C. and discharged in dry ice. At this temperature, discharging can be done safely. After dry ice sublimation, silicone oil was removed via washing with hexane followed by centrifuging, where the washing/centrifuging cycle was performed three times. PBT spherical particles obtained with the average size of 80 μm. FIG. 3G is an optical micrograph of the particles of Example 7.

Figure 6B:
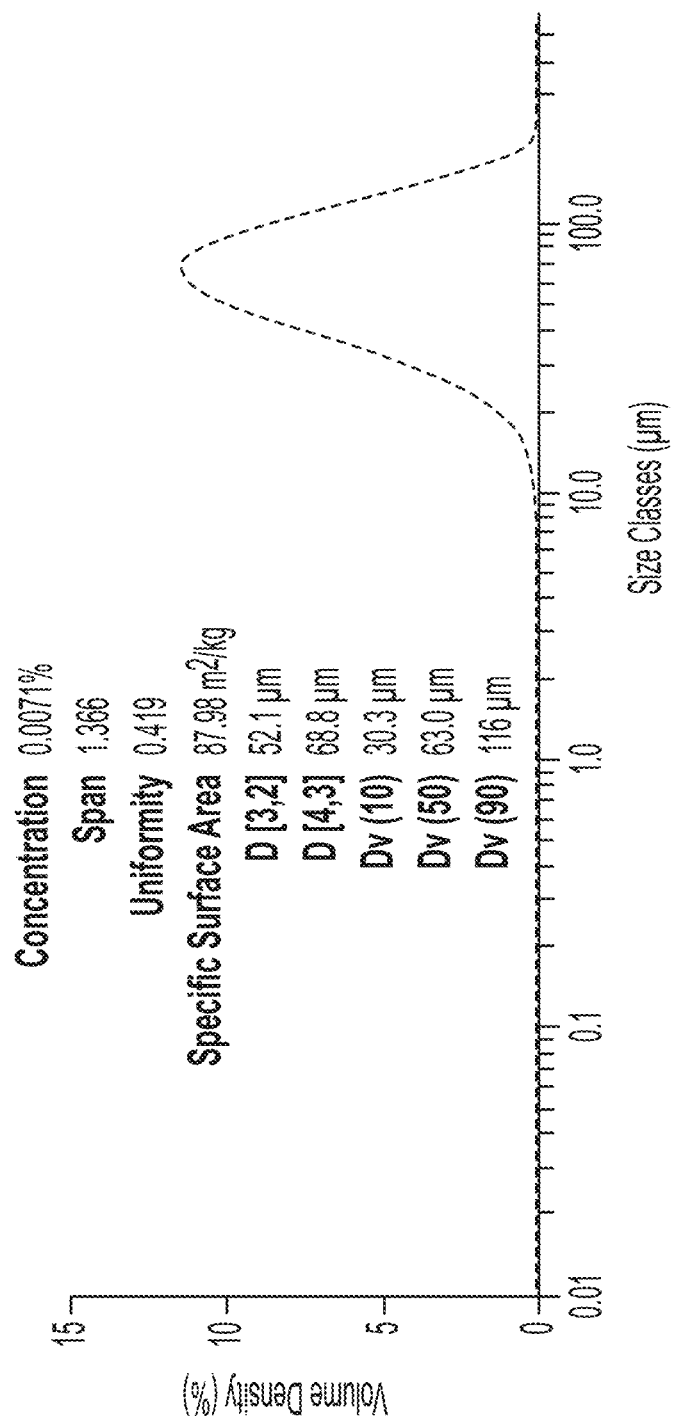
FIG. 6B is a plot of the particle size distribution for Example 8, including the size statistics.

Example 8. A 500 mL glass kettle reactor equipped with overhead stirrer, impeller, heating mantle, condenser, nitrogen inlet and outlet and electronic thermometer was charged with 82.55 g PDMS oil with the viscosity of 10,000 cSt (from Clearco Inc.) and 28.09 g tetraethylene glycol dimethyl ether (TGD) (from Sigma Aldrich) and heated up to between 250° C. and 255° C. while stirring at 350 rpm under slow $N_2$ stream. Then a blend of 49.50 PBT pellets (melt viscosity 8,500 p, from Scientific Polymer Inc.) and 5.50 g nylon 6 pellets (from sigma Aldrich) was added slowly (in around 10 min) while keeping the reactor temperature between 250° C. and 255° C. and stirring at 350 rpm (the ratio of PBT/nylon 6 was 9:1). The ratio of components was 3:2:1 for PDMS oil, polymers, and TGD, respectively. The mixture was stirred at 500 rpm at 250° C. for 85 minutes. Then 0.28 g (0.5% w of PBT content) AEROSIL™ RX50 silica additive was added and stirred at 500 rpm at 250° C. for 30 minutes. Final product was cooled down to 200° C. and discharged in dry ice. At this temperature condition, discharging can be done safely. After dry ice sublimation, silicone oil was removed via washing with hexane followed by centrifuging, where the washing/centrifuging cycle was performed three times. PBT spherical particles obtained with the average size of 120 μm. FIG. 3H is an optical micrograph of the particles of Example 8. FIG. 6B is a plot of the particle size distribution for Example 8 including the size statistics.

Example 9. A 500 mL glass kettle reactor equipped with overhead stirrer, P4 impeller, heating mantle, nitrogen inlet/outlet and electronic thermometer. The reactor charged with 75.5 g PDMS oil with the viscosity of 30K cSt (from Clearco Inc.) and 49.50 g PBT pellets (melt viscosity 6000 p; Scientificpolymer Inc.) and heated up to 250° C. to 255° C. while stirring at 150 rpm under slow $N_2$ stream for 45 min. Then 0.28 g (0.56% w of PBT content) AEROSIL™ R812S silica additive charged and stirred at 500 rpm/250° C. for 10 minutes. Final product discharged hot in dry ice and washed after dry ice sublimation three times using hexane. Obtained PBT spherical particles dried 50° C. in an electric oven overnight and particle size measured to be 110 μm (D50).

Figure 7:
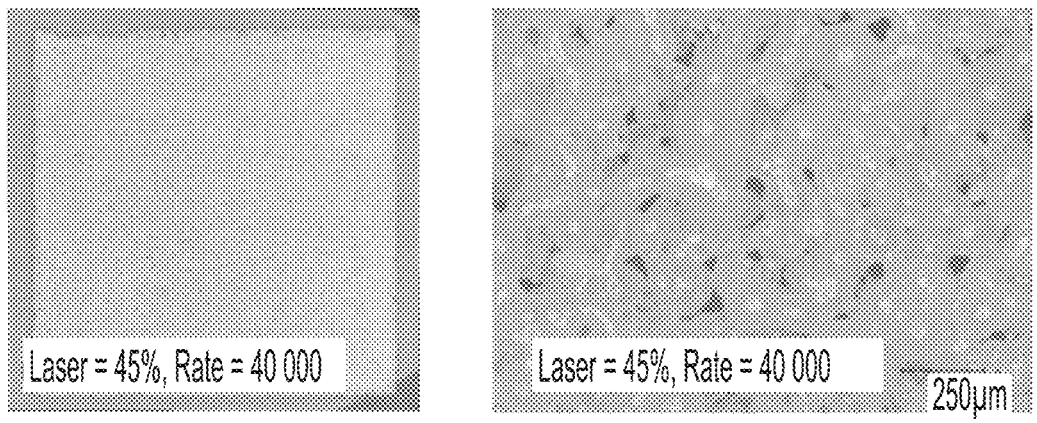
FIG. 7 includes two pictures of the sintered layer from Example 9 at 45% laser power.

Selective laser sintering (SLS) was performed using a Snow White SLS printer system (Sharebot). The thermoplastic polyurethane particulates of Example 9-3 were deposited using the SLS printer system in a 30 mm×30 mm square and then sintered under various laser power conditions specified in Table 1 below. Void percentage, Table 1, following sintering was calculated using the digital microscope software. FIG. 7 includes two pictures of the sintered layer at 45% laser power.

TABLE 1

| Laser Power (%) | Scan Rate | Temp. (° C.) | % Voids |
|---|---|---|---|
| 20 | 40,000 | 170 | NS |
| 25 | 40,000 | 170 | NS |
| 30 | 40,000 | 170 | 5.1 |
| 35 | 40,000 | 170 | 2.7 |
| 40 | 40,000 | 170 | 1.8 |
| 45 | 40,000 | 170 | 2.0 |

NS—not successfully sintered into a single piece.

Example 10. A 500 mL glass kettle reactor equipped with overhead stirrer, P4 impeller, heating mantle, nitrogen inlet/outlet and electronic thermometer. The reactor charged with 82.74 g PDMS oil with the viscosity of 5K cSt (from Clearco Inc.) and 0.55 g AEROSIL™ R812S silica additive (1.0% w of PBT content) and heated up to 250° C. while stirring at 300 rpm. Then 55.0 g PBT pellets (melt viscosity 6000 p; Scientificpolymer Inc.) added while the temperature was 240° C. to 250° C. at 300 rpm. When PBT charging completed, rpm increased to 500 rpm and stirred for 60 min. Final product discharged hot in dry ice and washed after dry ice sublimation three times using hexane. Obtained PBT spherical particles dried 50° C. in an electric oven overnight and particle size measured to be 86 μm (D50) after screening with sieve having pore size of 250 μm.

Figure 8:
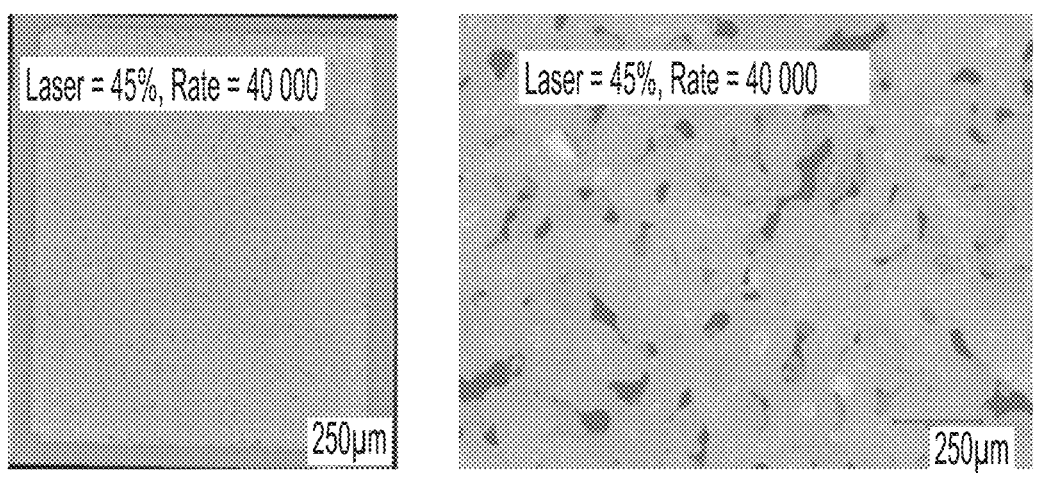
FIG. 8 includes two pictures of the sintered layer from Example 10 at 45% laser power.

As described in Example 9, the particles of Example 10 were sintered. Sintering conditions and results are presented in Table 2. FIG. 8 includes two pictures of the sintered layer at 45% laser power.

TABLE 2

| Laser Power (%) | Scan Rate | Temp. (° C.) | % Voids |
|---|---|---|---|
| 20 | 40,000 | 170 | NS |
| 25 | 40,000 | 170 | NS |
| 30 | 40,000 | 170 | NS |
| 35 | 40,000 | 170 | 7.6 |
| 40 | 40,000 | 170 | 5.3 |
| 45 | 40,000 | 170 | 4.2 |
| 50 | 40,000 | 170 | 2.9 |
| 55 | 40,000 | 170 | 2.7 |

NS—not successfully sintered into a single piece.

Figures 9A, 9B:
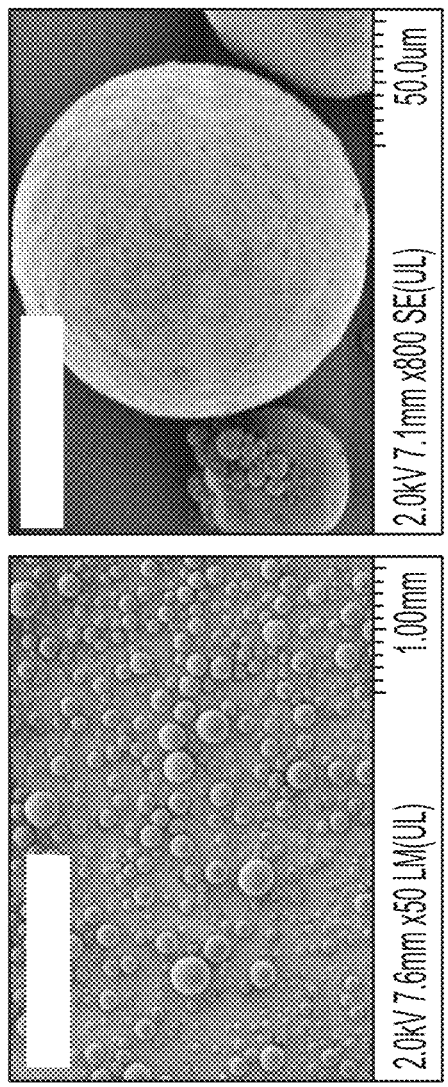
Figures 9C, 9D:
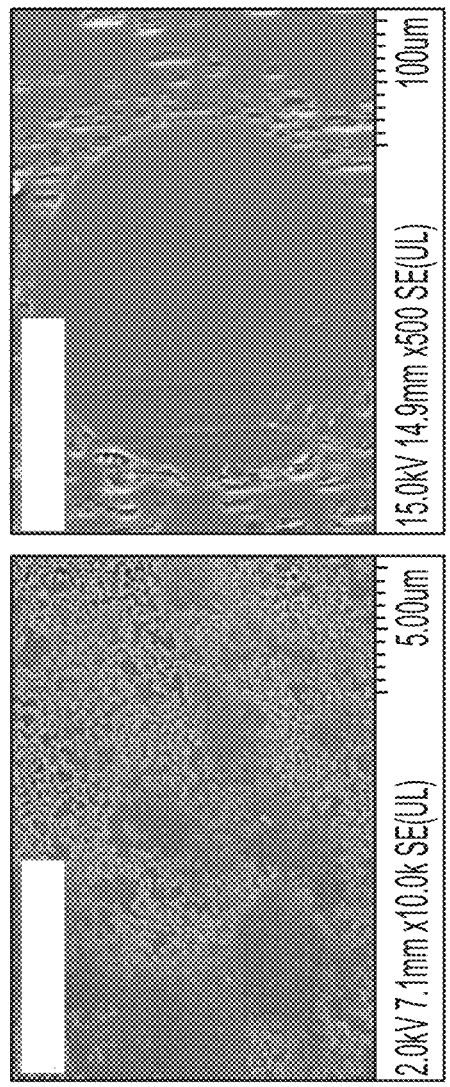

Example 11. A 500 mL glass kettle reactor equipped with overhead stirrer, P4 impeller, heating mantle, nitrogen inlet/outlet and electronic thermometer. The reactor charged with 100.23 g PDMS oil with the viscosity of 18-22K cSt (from Sigma Aldrich), 5.12 g TGD, 50.05 g PBT pellets (MFI: 18 g/10 min from DuPont) and 0.51 g AEROSIL™ R812S silica additive (1.0% w of PBT content). Then heated up to 250° C. while stirring at 300 rpm under slow $N_2$ stream. Once the temperature reached 250° C. (in around 20-25 min), rpm increased to 620. After 75 min, final product discharged hot in dry ice and washed three times using hexane. Obtained PBT spherical particles dried 50° C. in an electric oven overnight and particle size measured to be 83 and 93 μm (D50), respectively, before and after screening with the sieve having pore size of 250 μm. FIG. 9 includes three SEM micrographs (top) of the particles and three SEM micrographs (bottom) of cross-sections of the particles (samples cross-sectioned using cryo-microtoming).

Figure 10A:
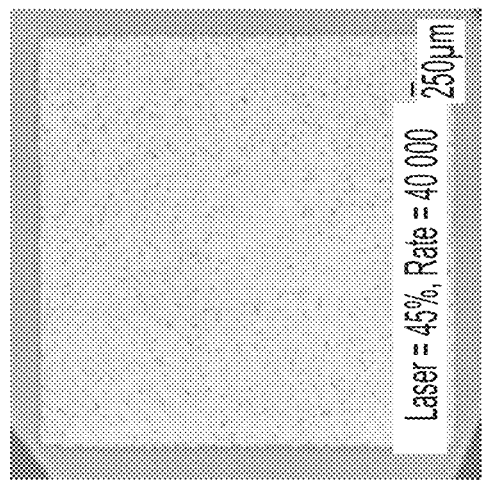
FIGS. 10A-B includes two pictures of the sintered layer from Example 11 at 45% laser power.
Figure 10B:
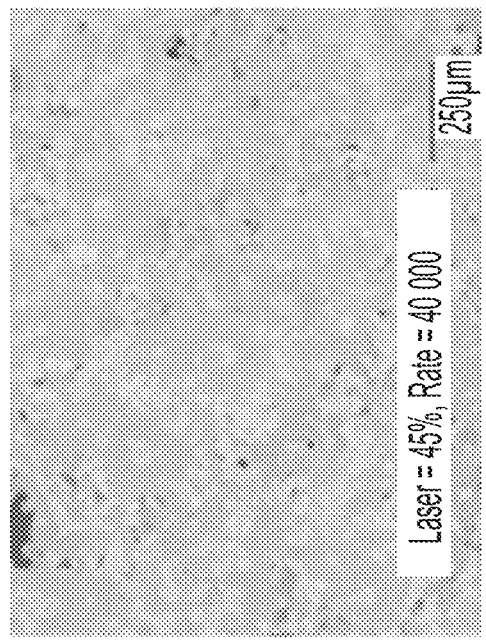

As described in Example 9, the particles of Example 11 were sintered. Sintering conditions and results are presented in Table 3. FIG. 10 includes two pictures of the sintered layer at 45% laser power.

TABLE 3

| Laser Power (%) | Scan Rate | Temp. (° C.) | % Voids |
|---|---|---|---|
| 20 | 40,000 | 170 | NS |
| 25 | 40,000 | 170 | 7.3 |
| 30 | 40,000 | 170 | 5.0 |
| 35 | 40,000 | 170 | 2.5 |
| 40 | 40,000 | 170 | 2.0 |
| 45 | 40,000 | 170 | 0.7 |

NS—not successfully sintered into a single piece.

Figures 11C, 11D:
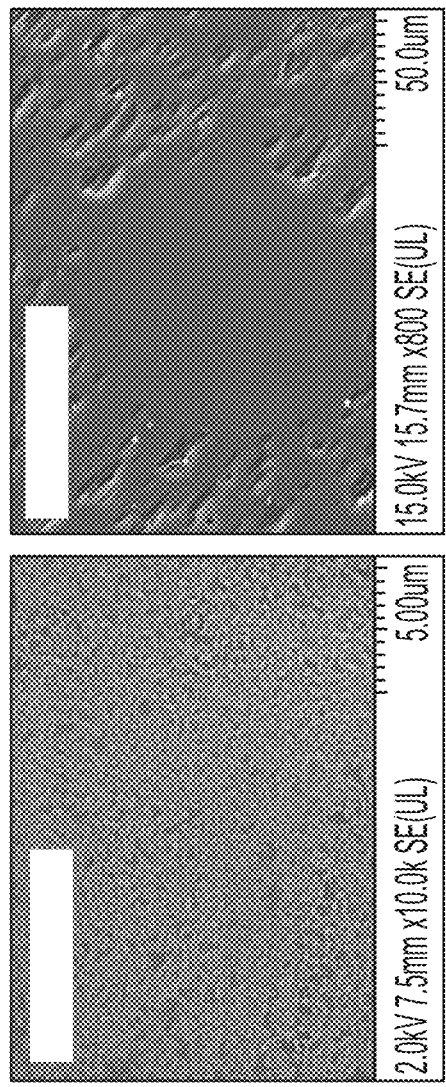
Figures 11E, 11F:
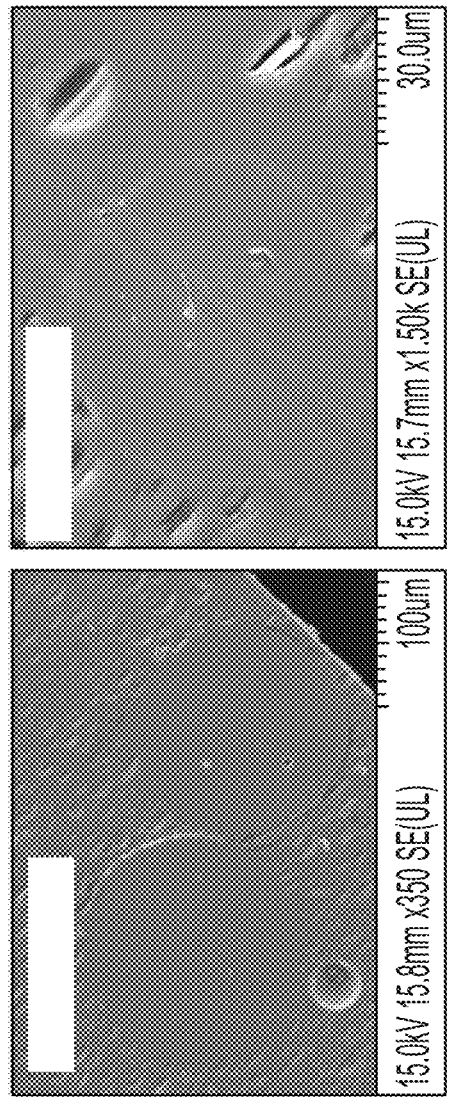

Example 12. A 500 mL glass kettle reactor equipped with overhead stirrer, P4 impeller, heating mantle, nitrogen inlet/outlet and electronic thermometer. The reactor charged with 100.25 g PDMS oil with the viscosity of 10K cSt (from Clearco Inc.), 5.14 g TGD, 50.1 g PBT pellets (MFI: 18 g/10 min from DuPont) and 0.50 g AEROSIL™ R812S silica additive (1.0% w of PBT content). Then heated up to 250° C. while stirring at 300 rpm under slow $N_2$ stream. Once the temperature reached 250° C. (in around 20-25 min), rpm increased to 620. After 75 min, final product discharged hot in dry ice and washed three times using hexane. Obtained PBT spherical particles dried 50° C. in an electric oven overnight and particle size measured to be 83 and 93 μm (D50), respectively, before and after screening with the sieve having pore size of 250 μm. FIG. 11 includes three SEM micrographs (top) of the particles and three SEM micrographs (bottom) of cross-sections of the particles (samples cross-sectioned using cryo-microtoming).

Figures 12A, 12B:
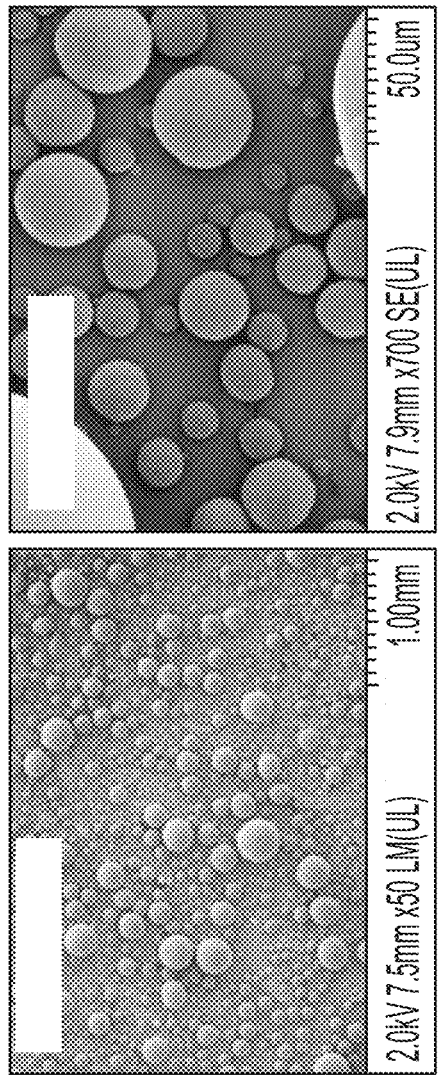
FIG. 12A-B are scanning electron micrographs and FIGS. 12C-F are cross-section scanning electron micrographs of the particles of Example 13.
Figures 12C, 12D:
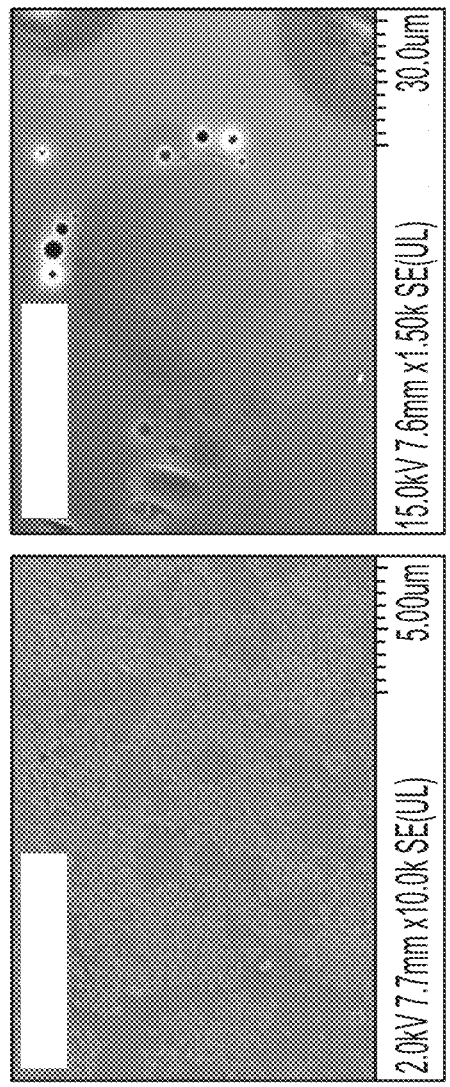
Figures 12E, 12F:
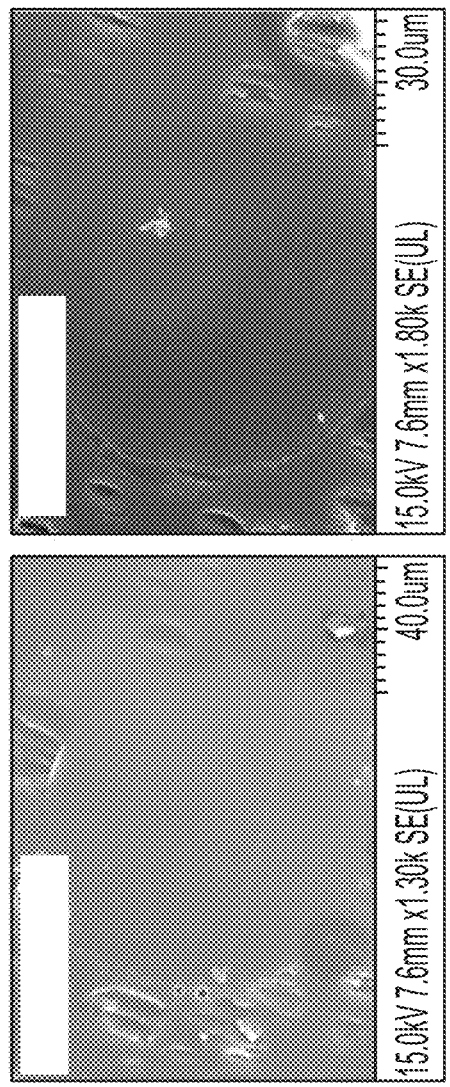

Example 13. A 500 mL glass kettle reactor equipped with overhead stirrer, P4 impeller, heating mantle, nitrogen inlet/outlet and electronic thermometer. The reactor charged with 100.56 g PDMS oil with the viscosity of 30K cSt (from Clearco Inc.), 5.16 g TGD, 50.12 g PBT pellets (MFI: 18 g/10 min from DuPont) and 0.50 g AEROSIL™ R812S silica additive (1.0% w of PBT content). Then heated up to 250° C. while stirring at 300 rpm under slow $N_2$ stream. Once the temperature reached 250° C. (in around 20-25 min), rpm increased to 620. After 75 min, final product discharged hot in dry ice and washed three times using hexane. Obtained PBT spherical particles dried 50° C. in an electric oven overnight and particle size measured to be 123 and 85 μm (D50), respectively, before and after screening with the sieve having pore size of 250 μm. FIG. 12 includes three SEM micrographs (top) of the particles and three SEM micrographs (bottom) of cross-sections of the particles (samples cross-sectioned using cryo-microtoming).

Figure 13B:
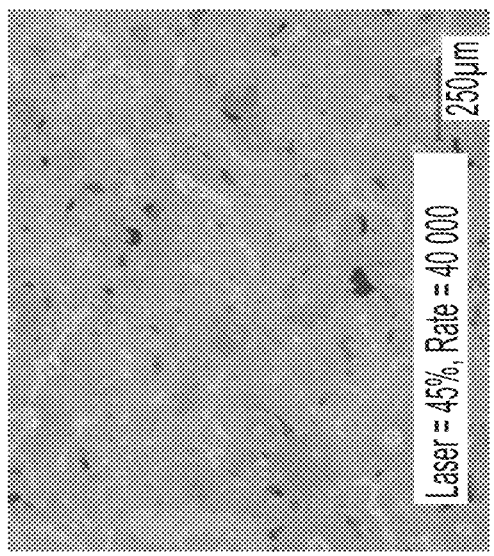
FIGS. 13A-B are pictures of the sintered layer from Example 13 at 45% laser power.
Figure 13A:
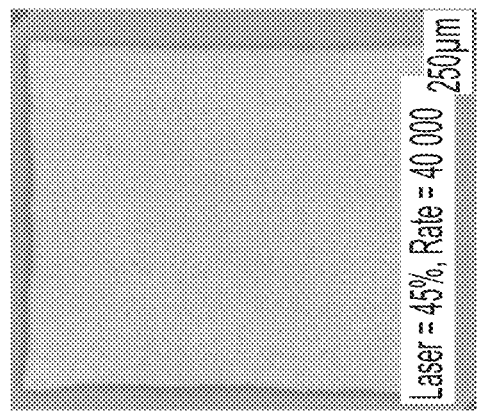

As described in Example 9, the particles of Example 13 were sintered. Sintering conditions and results are presented in Table 4. FIG. 13 includes two pictures of the sintered layer at 45% laser power.

TABLE 4

| Laser Power (%) | Scan Rate | Temp. (° C.) | % Voids |
|---|---|---|---|
| 20 | 40,000 | 170 | NS |
| 25 | 40,000 | 170 | 3.0 |
| 30 | 40,000 | 170 | 1.0 |
| 35 | 40,000 | 170 | 0.7 |
| 40 | 40,000 | 170 | 0.4 |
| 45 | 40,000 | 170 | 0.3 |

NS—not successfully sintered into a single piece.

Example 14. A 2 L Buchi reactor equipped with anchor and 0.5 D/T P4 impeller, heating bath, nitrogen inlet/outlet charged with 800.5 g PDMS oil with the viscosity of 30K cSt (from Clearco Inc.), 42.3 g TGD, 400.6 g PBT pellets (Crastin™ S600F20 NC010; MFI: 18 g/10 min from DuPont) and 4.1 g AEROSIL™ R812S silica additive (1.0% w of PBT content). The reactor was purged with nitrogen, sealed, and heated up to 245° C. while stirring at 300 rpm. Once the temperature reached 240° C. (in around 90 min), rpm increased to 650. After 75 min, reactor was cooled down to 75° C. and 400 g heptane was added to help product discharging. Final product was washed three times using heptane and dried at 50° C. in an electric oven overnight. Particle size measured to be 66 μm (D50) with the span of 2.01.

Example 15. The same procedure was followed using different a grade of PBT, which was the same PBT grade used in Example 16 (ResMart Ultra PBT 23). The results were comparable by means of particles size and distribution, 55 μm (D50) with the span of 2.43. Sintering window [(Tm−Tc)onset] was 21.5° C. and (Tm−Tc) was 30.3° C.

Figures 14A, 14B:
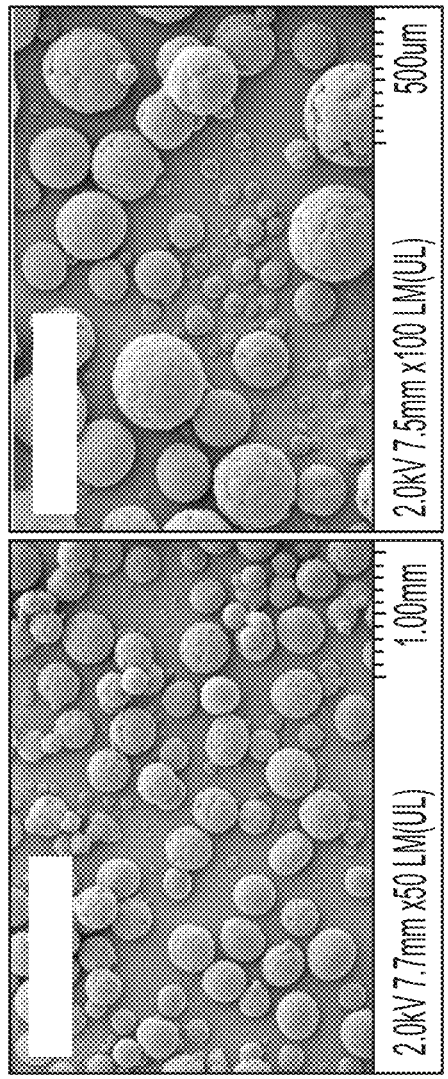
Figure 15:
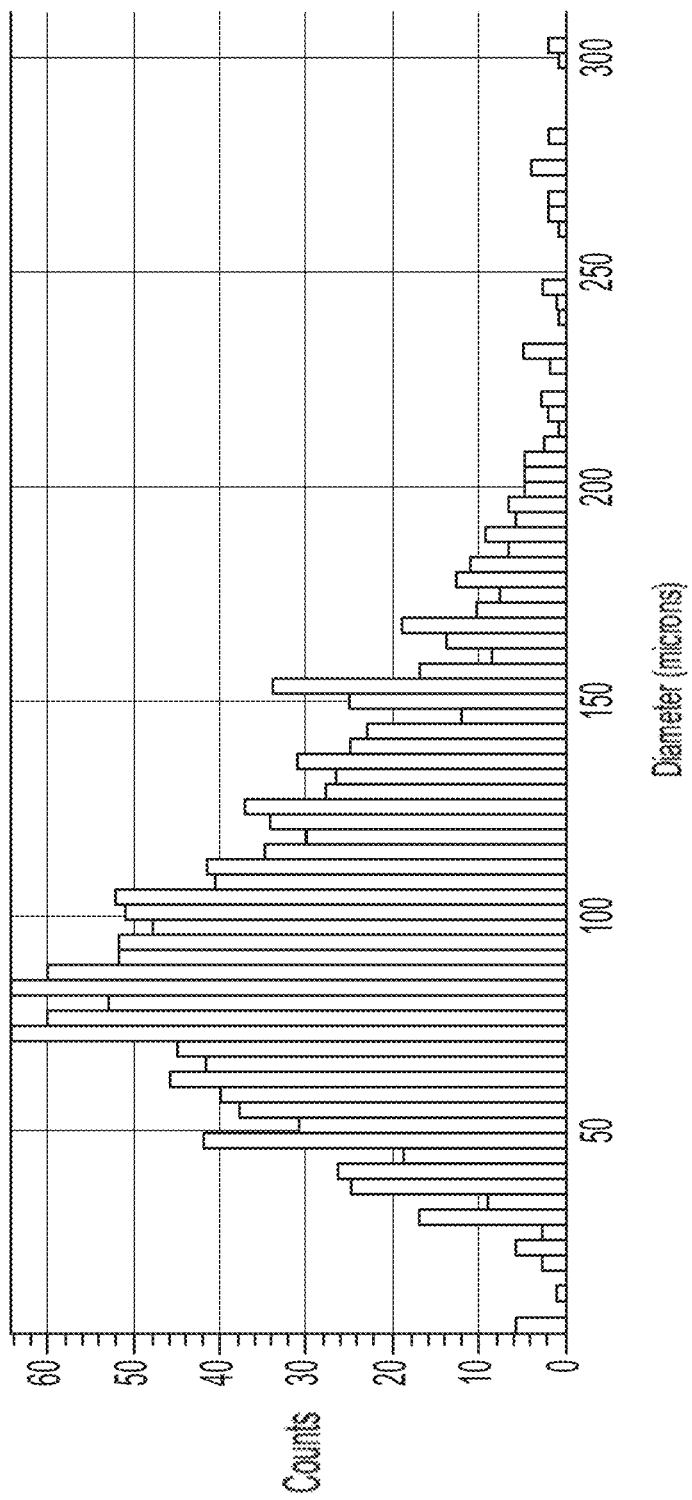
FIG. 15 is a histogram of the particle size of the particles produced in Example 17.
Figure 16B:
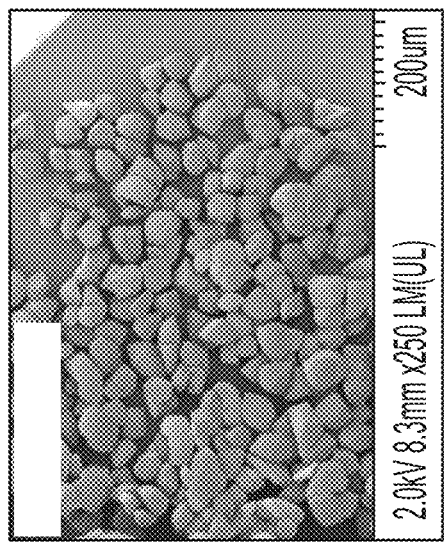
FIG. 16A-E includes scanning electron micrographs at various magnifications of the particles produced in Example 18.
Figure 16A:
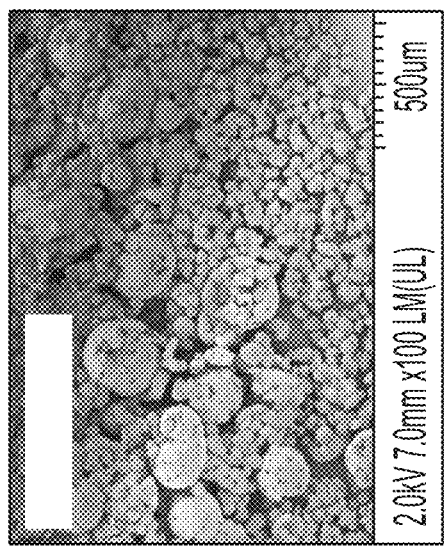
Figures 16C, 16D:
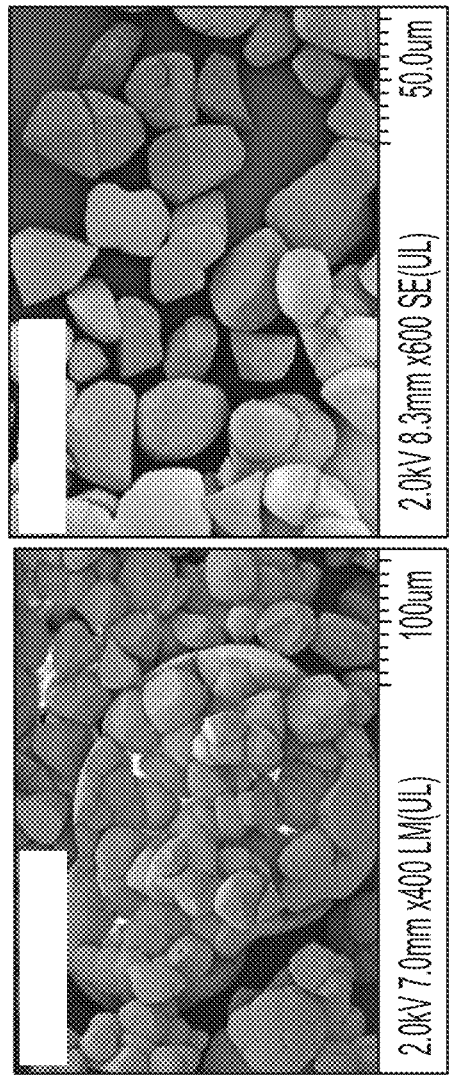
Figure 16E:
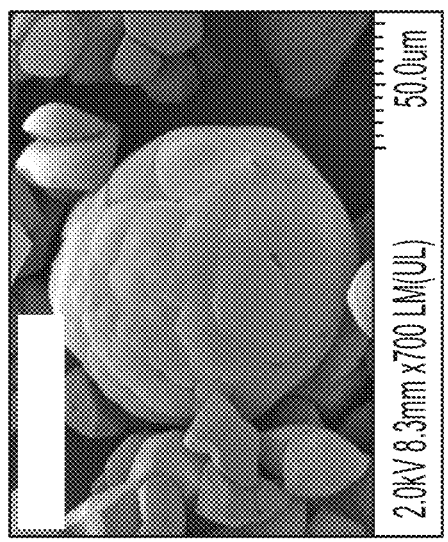

Example 16. PBT polymer particles were produced from ResMart Ultra PBT 23 in a 27 mm twin-screw extruder (Leistritz ZSE 27 HP). The carrier fluid was PDMS oil with 30,000 cSt viscosity at room temperature. The concentrations of components in the final mixture in the extruder are provided in Table 5. The polymer pellets were added to the extruder and brought to temperature per Table 5. Then, preheated carrier fluid having AEROSIL™ R812S silica nanoparticles dispersed therein was added to the molten polymer in the extruder. The screw speed was 1000 rpm. Then, the mixture was discharged into a container and allowed to cool to room temperature over several hours. The light scattering particle size data is also provided in Table 5.

of components was 3:2:1 for PDMS oil, PBT and TGD, respectively. The mixture was stirred at 600 rpm at 250° C. for 1 hour then discharged in dry ice while keeping hot paste away from oxygen to avoid autoignition of TGD. After dry ice sublimation, silicon oil was removed via three times washing/filtration by hexane. PBT spherical particles obtained with the average size of 100-150 μm. FIG. 14 includes SEM micrographs at various magnifications of the particles produced. FIG. 15 is a histogram of the particle size.

Figure 17:
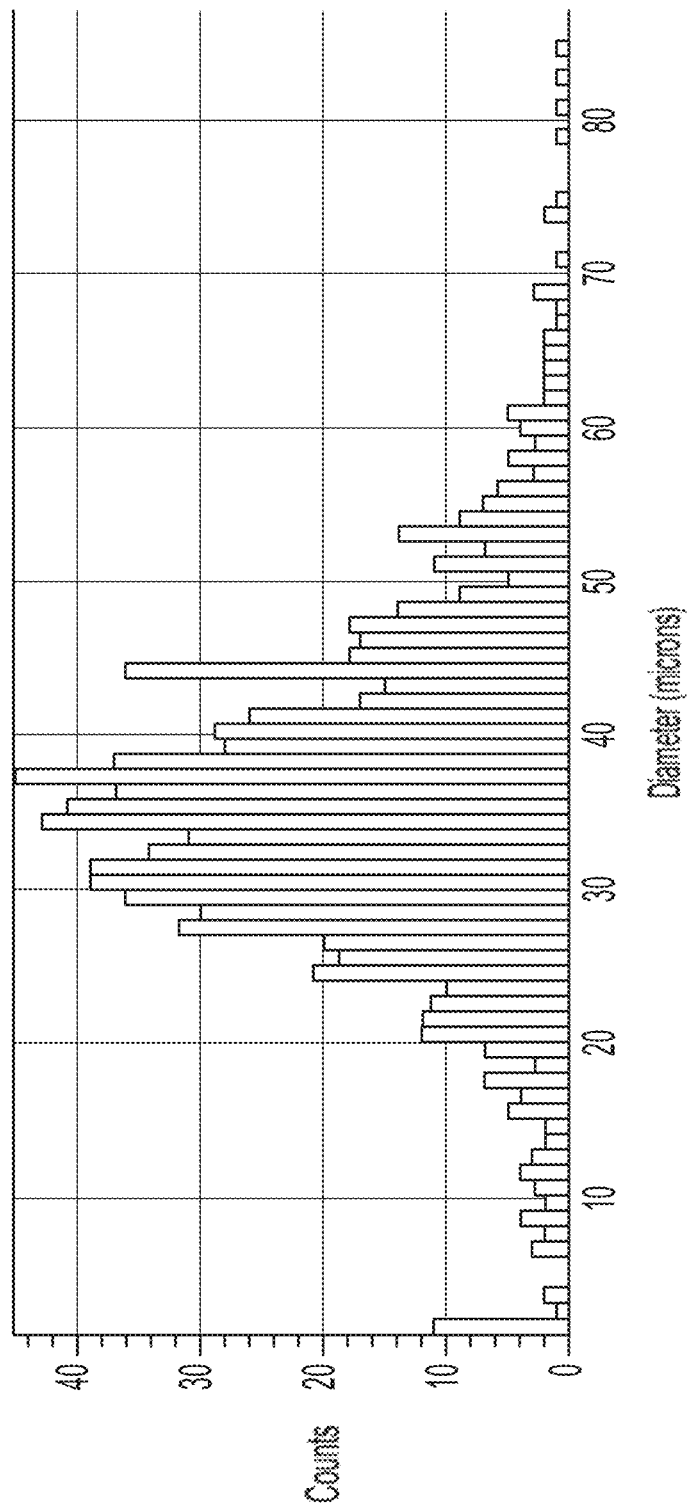
FIG. 17 is a histogram of the particle size of the particles produced in Example 18.

Example 18. A 100 mL glass kettle reactor equipped with overhead stirrer, P4 impeller, heating mantle, nitrogen inlet/outlet and electronic thermometer. The reactor charged with 10.85 g PDMS oil with the viscosity of 10K cSt (from Clearco Inc.), 10.92 g TGD (from Sigma Aldrich) and 10.85 g PBT pellets (melt viscosity 6000 p; Scientificpolymer Inc.) and heated up to 250° C. to 255° C. while stirring at 350 rpm under slow $N_2$ stream for 25 min. Final product was hot discharged in dry ice and washed three times using hexane after dry ice sublimation. Obtained PBT spherical particles dried 50° C. in an electric oven overnight and average particle size measured to be 30-40 μm. FIG. 16 includes SEM micrographs at various magnifications of the particles produced. FIG. 17 is a histogram of the particle size.

Figure 18A:
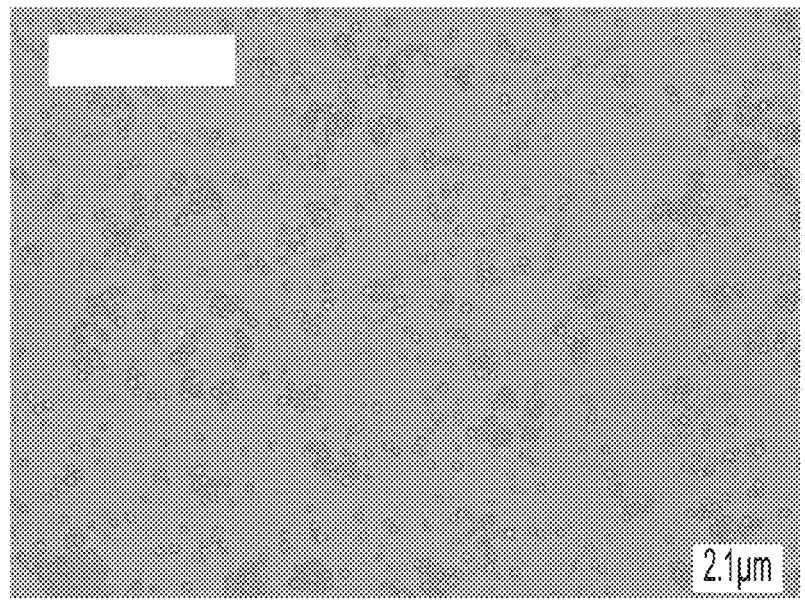
FIG. 18A-B are optical micrographs at various magnifications of the particles produced in Example 19.
Figure 18B:
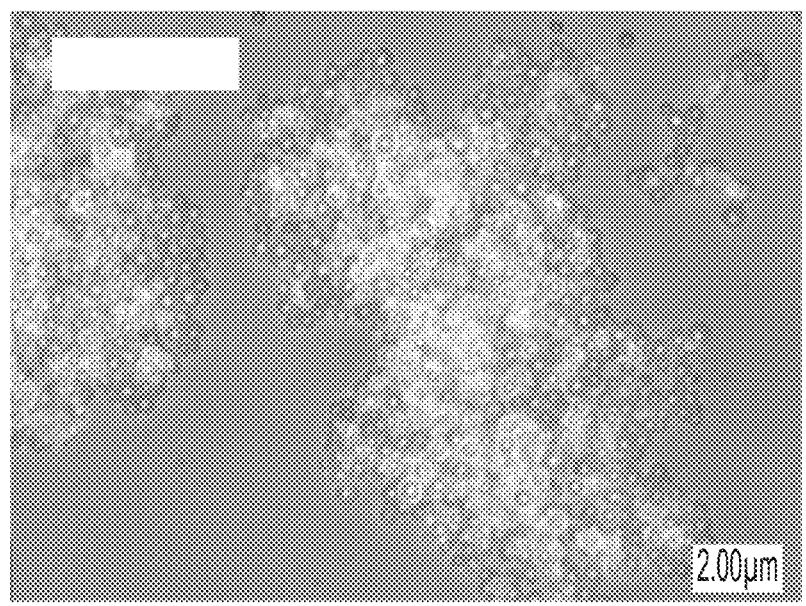
Figure 19:
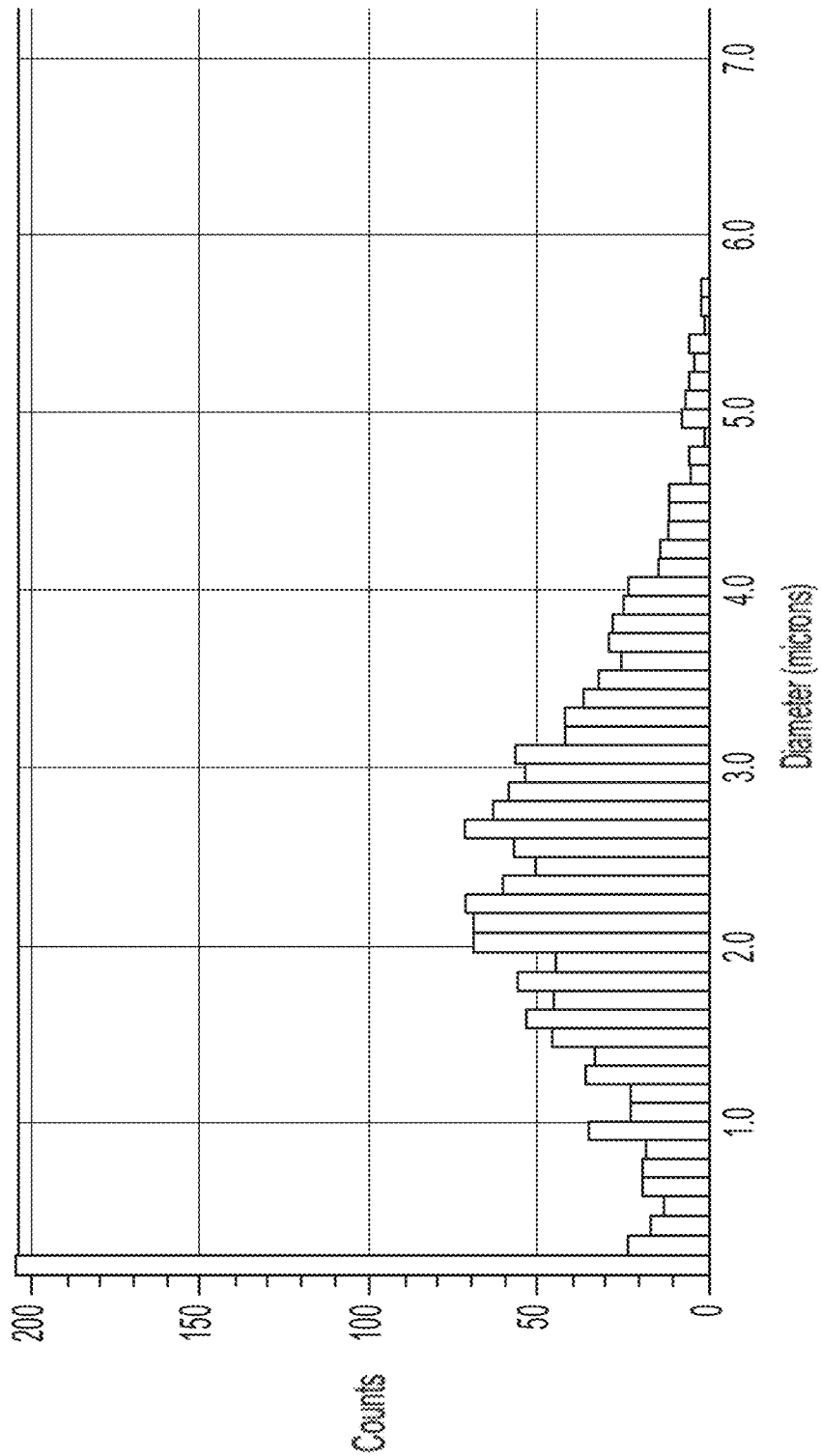
FIG. 19 is a histogram of the particle size of the particles produced in Example 19.

Example 19. A 100 mL glass kettle reactor equipped with overhead stirrer, impeller, heating mantle, condenser, nitrogen inlet and outlet and electronic thermometer was charged with 11.0 g PDMS oil with the viscosity of 18,000-22,000 cSt (from Sigma Aldrich), 0.05 g (0.6% w of PBT content) AEROSIL™ R812S silica additive and 5.5 g TGD. Then heated up to 250° C. to 255° C. while stirring at 300 rpm under slow $N_2$ stream. Then 8.27 g PBT pellets (melt viscosity 6,000 p) was added slowly while keeping the reactor temperature between 250° C. and 255° C. and stirring at 300 rpm. The mixture was stirred at 400 rpm at 250° C. for 60 minutes. The final product was hot discharged in dry ice. After dry ice sublimation, silicone oil was removed via washing with hexane followed by centrifuging, where the washing/centrifuging cycle was repeated for three times. PBT spherical particles obtained with the average size of 2.5 μm. FIG. 18 includes optical micrographs at various magnifications of the particles produced. FIG. 19 is a histogram of the particle size.

TABLE 5

| Sample | Temp. (° C.) | Target Poly. Load | Actual Poly. Load | Target Silica Conc. | Actual Silica Conc. | D10 (μm) | D50 (μm) | D90 (μm) | Span |
|---|---|---|---|---|---|---|---|---|---|
| 16A | 270 | 50% | 41% | 1.00% | 1.40% | 18.8 | 30.1 | 47.3 | 0.95 |
| 16B | 290 | 50% | 42% | 1.00% | 1.35% | 13.1 | 19.2 | 27.6 | 0.76 |
| 16C | 290 | 40% | 45% | 1.00% | 0.81% | 14.5 | 20.4 | 28.6 | 0.70 |
| 16D | 290 | 50% | 44% | 0.50% | 0.63% | 17.6 | 25.8 | 37.2 | 0.76 |
| 16E | 270 | 50% | 44% | 0.50% | 0.64% | 31.2 | 45.2 | 65.2 | 0.75 |
| 16F | 290 | 40% | 48% | 0.50% | 0.36% | 41.0 | 57.1 | 79.4 | 0.67 |
| 16G | 250 | 40% | 48% | 0.50% | 0.36% | 118.0 | 184.0 | 286.0 | 0.91 |

Example 17. A 500 mL glass kettle reactor equipped with overhead stirrer, P4 impeller, heating mantle, condenser, nitrogen inlet and outlet, and electronic thermometer was charges with 150.0 g PDMS oil with the viscosity of 10,000 cSt and 50.0 g TGD and heated up to 250° C. to 255° C. while stirring at 350 rpm under slow $N_2$ stream. Then 100.0 PBT pellets (melt viscosity 6,000p) was added slowly (in around 10 min) while keeping the reactor temperature between 250° C. to 255° C. and stirring at 350 rpm. The ratio The above examples illustrate that PBT polymer particles can be produced by melt emulsification methods.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed:

1. A method comprising:
   mixing a melt emulsion comprising (a) a continuous phase that comprises a carrier fluid having a polarity Hansen solubility parameter ($d_P$) of about 7 MPa$^{0.5}$ or less, (b) a dispersed phase that comprises a dispersing fluid having a $d_P$ of about 8 MPa$^{0.5}$ or more, and (c) an inner phase that comprises a thermoplastic polyester at a temperature greater than a melting point or softening temperature of the thermoplastic polyester and at a shear rate sufficiently high to disperse the thermoplastic polyester in the dispersed phase; and
   cooling the melt emulsion to below the melting point or softening temperature of the thermoplastic polyester to form solidified particles comprising the thermoplastic polyester.

2. The method of claim 1, wherein the temperature of the mixing is about 200° C. to about 320° C.

3. The method of claim 1, wherein cooling is to a temperature below 160° C.

4. The method of claim 1, wherein the carrier fluid comprises a member selected from the group consisting of silicone oil, fluorinated silicone oils, perfluorinated silicone oils, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and any combination thereof.

5. The method of claim 1, wherein the dispersing fluid comprises a member selected from the group consisting of polyethylene glycols, alkyl-terminal polyethylene glycols, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and any combination thereof.

6. The method of claim 1, wherein the carrier fluid comprises a silicone oil and the dispersing fluid comprises an alkyl-terminal polyethylene glycol.

7. The method of claim 1, wherein a weight ratio of the carrier fluid to the dispersing fluid of about 1:3 to about 100:1.

8. The method of claim 1, wherein the thermoplastic polyester is present at 90 wt % to 99.5 wt % of the solidified particles.

9. The method of claim 1, wherein the mixture further comprises an emulsion stabilizer.

10. The method of claim 9, wherein the emulsion stabilizer is associated with a surface of the solidified particles.

11. The method of claim 10, wherein at least a portion of the emulsion stabilizer is embedded in the surface of the solidified particles.

12. The method of claim 1, wherein the thermoplastic polyester comprises a member selected from the group consisting of polybutylene terephthalate (PBT), polyethylene terephthalate (PET), polyethylene naphthalate (PEN), polytrimethylene terephthalate (PTT), polyhexamethylene terephthalate, and any combination thereof.

13. The method of claim 1, wherein the solidified particles have a sintering window that is within 5° C. of a sintering window of the thermoplastic polyester before forming the solidified particles.

14. A method comprising:
    mixing a melt emulsion comprising (a) a continuous phase that comprises a carrier fluid having a polarity Hansen solubility parameter ($d_P$) of about 7 MPa$^{0.5}$ or less, (b) a dispersed phase that comprises a dispersing fluid having a $d_P$ of about 8 MPa$^{0.5}$ or more, and (c) an inner phase that comprises a thermoplastic polyester at about 200° C. to about 320° C. and at a shear rate sufficiently high to disperse the thermoplastic polyester in the dispersed phase, wherein the thermoplastic polyester comprises a member selected from the group consisting of polybutylene terephthalate (PBT), polyethylene terephthalate (PET), polyethylene naphthalate (PEN), polytrimethylene terephthalate (PTT), polyhexamethylene terephthalate, and any combination thereof; and
    cooling the melt emulsion to below 160° C. to form solidified particles comprising the thermoplastic polyester.

15. The method of claim 14, wherein the mixture further comprises an emulsion stabilizer, and wherein at least a portion of the emulsion stabilizer is embedded in the surface of the solidified particles.

* * * * *